United States Patent
Traister et al.

(10) Patent No.: US 7,451,265 B2
(45) Date of Patent: *Nov. 11, 2008

(54) NON-VOLATILE MEMORY STORAGE SYSTEMS FOR PHASED GARBAGE COLLECTION

(75) Inventors: Shai Traister, Sunnyvale, CA (US); Jason Lin, Santa Clara, CA (US)

(73) Assignee: SanDisk Corporation, Milpitas, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 11/499,598

(22) Filed: Aug. 4, 2006

(65) Prior Publication Data

US 2008/0034174 A1  Feb. 7, 2008

(51) Int. Cl.
*G06F 12/00* (2006.01)
(52) U.S. Cl. .................. 711/103; 711/154; 711/165
(58) Field of Classification Search .......... 707/206
See application file for complete search history.

(56) References Cited

U.S. PATENT DOCUMENTS

| | | | | |
|---|---|---|---|---|
| 5,640,529 | A * | 6/1997 | Hasbun ................ | 711/103 |
| 6,510,440 | B1 * | 1/2003 | Alpern et al. ......... | 707/206 |
| 6,792,601 | B1 * | 9/2004 | Dimpsey et al. ...... | 718/102 |
| 7,114,045 | B1 * | 9/2006 | Pliss et al. ............ | 711/159 |
| 7,287,049 | B1 * | 10/2007 | Printezis et al. ...... | 707/206 |
| 2001/0023472 | A1 * | 9/2001 | Kubushiro et al. .... | 711/103 |
| 2005/0141312 | A1 | 6/2005 | Sinclair et al. | |
| 2006/0161724 | A1 | 7/2006 | Bennett ................. | 711/103 |
| 2006/0161728 | A1 | 7/2006 | Bennett et al. | |
| 2007/0033324 | A1 | 2/2007 | Sinclair ................. | 711/103 |
| 2008/0034175 | A1 | 2/2008 | Traister et al. ........ | 711/103 |
| 2008/0082596 | A1 | 4/2008 | Gorobets .............. | 711/103 |

(Continued)

FOREIGN PATENT DOCUMENTS

WO  WO2005/045683  5/2005
WO  WO2006/065655  6/2006

OTHER PUBLICATIONS

ISR Invitation to Pay Additional Fees dated Apr. 21, 2008 in related International Application No. PCT/US2007/ 073891 (5 pages).

(Continued)

*Primary Examiner*—Jack A Lane
(74) *Attorney, Agent, or Firm*—Weaver Austin Villeneuve Sampson LLP

(57) ABSTRACT

A non-volatile memory storage system is provided. The non-volatile memory storage system includes a memory configured to store a storage system firmware and a non-volatile memory cell array configured to maintain a buffer. A processor in communication with the memory and the non-volatile memory cell array also is included in the non-volatile memory storage system. Here, the processor is configured to execute the storage system firmware stored in the memory. The storage system firmware comprises program instructions for receiving a write command to write data to the non-volatile memory cell array. The write command is allocated a timeout period to complete an execution of the write command. The storage system firmware also comprises program instructions for performing a portion of a garbage collection operation within the timeout period and for storing the data in the buffer.

26 Claims, 18 Drawing Sheets

U.S. PATENT DOCUMENTS

| | | | |
|---|---|---|---|
| 2008/0082728 A1 | 4/2008 | Traister et al. | 711/159 |
| 2008/0082775 A1 | 4/2008 | Gorobets | 711/159 |
| 2008/0086619 A1 | 4/2008 | Traister et al. | 711/103 |
| 2008/0091872 A1* | 4/2008 | Bennett et al. | 711/103 |

OTHER PUBLICATIONS

USPTO Notice of Allowance and Fee(s) Due mailed Jul. 1, 2008, 2008 in U.S. Appl. No. 11/499,606.

USPTO Notice of Allowance and Fee(s) Due mailed Aug. 6, 2008 in U.S. Appl. No. 11/540,778.

USPTO Notice of Allowance and Fee(s) Due mailed Aug. 8, 2008 in U.S. Appl. No. 11/541,371.

USPTO Notice of Allowance and Fee(s) Due mailed Jul. 17, 2008 in U.S. Appl. No. 11/541,035.

USPTO Notice of Allowance and Fee(s) Due mailed Jul. 16, 2008 in U.S. Appl. No. 11/541,012.

* cited by examiner

NON-VOLATILE MEMORY STORAGE SYSTEMS FOR PHASED GARBAGE COLLECTION

CROSS-REFERENCES TO RELATED APPLICATIONS

This application is related to U.S. patent application Ser. No. 11/499,606, filed on Aug. 4, 2006, and entitled "Methods for Phased Garbage Collection," and is related to U.S. patent application Ser. No. 11/040,325, filed on Jan. 20, 2005, and entitled "Scheduling of Housekeeping Operations in Flash Memory Systems," the disclosures of which are incorporated herein by reference.

FIELD OF THE INVENTION

The present invention relates generally to memory operations and, more particularly, to methods and systems for performing phased garbage collection operations.

BACKGROUND

In non-volatile memory storage systems, blocks of data stored in the memory are periodically garbage collected (i.e., compacted or consolidated) to reclaim a memory's storage capacity. In a typical garbage collection operation, valid data from a block are copied to another block. After the valid data are transferred, the original block is erased to provide storage capacity. Currently, a write operation can trigger a non-volatile memory storage system to perform a garbage collection operation. The host allows a fixed amount of time for the execution of the write operation, which includes the garbage collection operation, if triggered. For example, the Secure Digital protocol limits the amount of time to 250 milliseconds. A timeout error can result if the non-volatile memory storage system exceeds this fixed amount of time in a write operation.

The sizes of memory blocks have been increasing due to increased capacity, higher parallelism, and die size scaling. Accordingly, execution of write operations are taking longer because more data are transferred. A garbage collection operation can therefore easily exceed the fixed amount of time allocated to the write operation. As a result, there is a need to prevent the timeout errors when the amount of time to perform a garbage collection operation exceeds the fixed amount of time.

SUMMARY

Various embodiments of the present invention provide methods and/or systems for phased garbage collection. It should be appreciated that the embodiments can be implemented in numerous ways, including as a method, a circuit, a system, or a device. Several embodiments of the present invention are described below.

In accordance with an embodiment of the invention, a non-volatile memory storage system is provided. The non-volatile memory storage system includes a memory configured to store a storage system firmware and a non-volatile memory cell array configured to maintain a buffer. A processor in communication with the memory and the non-volatile memory cell array also is included in the non-volatile memory storage system. Here, the processor is configured to execute the storage system firmware stored in the memory. The storage system firmware comprises program instructions for receiving a write command to write data to the non-volatile memory cell array. The write command is allocated a timeout period to complete an execution of the write command. The storage system firmware also comprises program instructions for performing a portion of a garbage collection operation within the timeout period and for storing the data in the buffer.

Other embodiments and advantages of the invention are apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

A detailed description of one or more embodiments is provided below along with accompanying figures. The detailed description is provided in connection with such embodiments, but is not limited to any particular embodiment. The scope is limited only by the claims and numerous alternatives, modifications, and equivalents are encompassed. Numerous specific details are set forth in the following description in order to provide a thorough understanding. These details are provided for the purpose of example and the described embodiments may be implemented according to the claims without some or all of these specific details. For the purpose of clarity, technical material that is known in the technical fields related to the embodiments has not been described in detail to avoid unnecessarily obscuring the description.

The embodiments described herein provide methods and/or systems for phased garbage collection. In general, a garbage operation can be split into multiple phases. The phases (or portions) of the garbage collection operation can be performed over multiple timeout periods. In an embodiment, as will be explained in more detail below, a portion of a garbage collection operation is performed within one timeout period and the data received from the write command may be stored in a buffer.

Figure 1:
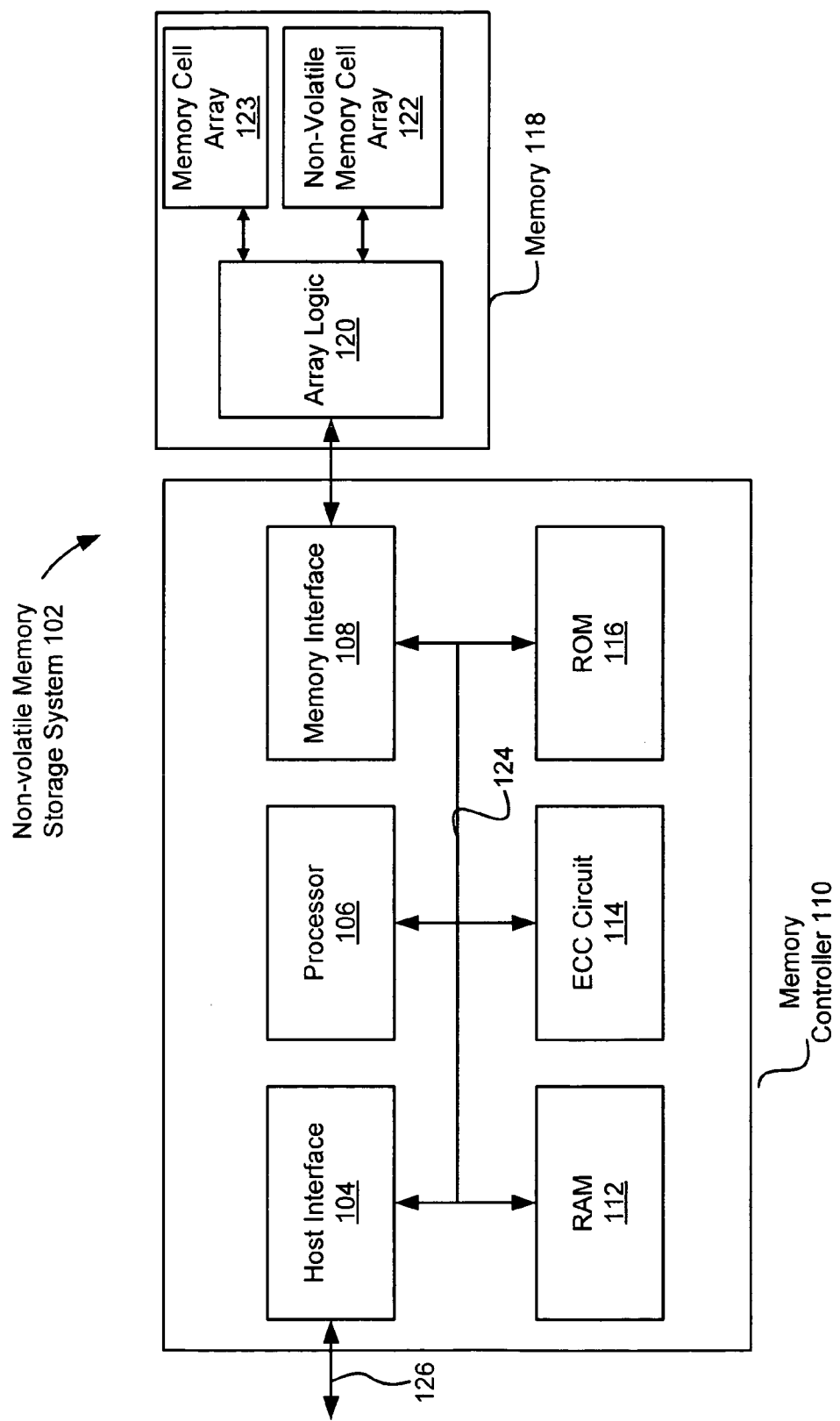
FIG. 1 is a simplified block diagram of an example of a non-volatile memory storage system, in accordance with an embodiment of the present invention.

FIG. 1 is a simplified block diagram of an example of a non-volatile memory storage system, in accordance with an embodiment of the present invention. A host system (e.g., desktop computers, audio players, digital cameras, and other computing devices) may write data to and read data from non-volatile memory storage system 102. Non-volatile memory storage system 102 may be embedded within the host or removably connected to the host. As shown in FIG. 1, non-volatile memory storage system 102 includes memory controller 110 in communication with memory 118. In general, memory controller 110 controls the operation of memory 118. Examples of operations include writing (or programming) data, reading data, erasing data, verifying data, attending to garbage collection operations, and other operations. Memory controller 110 includes bus 124 that interfaces with system bus 126 through host interface 104 and the memory controller interfaces with memory 118 through memory interface 108. Host interface 104, processor 106 (e.g., microprocessor, microcontrollers, and other processors), memory interface 108, random access memory (RAM) 112, error correcting code (ECC) circuit 114, and read-only memory (ROM) 116 are in communication by way of bus 124. ROM 116 can store a storage system firmware that includes program instructions for controlling the operation of memory 118. Processor 106 is configured to execute the program instructions loaded from ROM 116. The storage system firmware may be temporarily loaded into RAM 112 and additionally, the RAM may be used to buffer data that are transferred between a host and memory 118. ECC circuit 114 can check for error passing through memory controller 110 between the host and memory 118. If errors are found, ECC circuit 114 can correct a number of error bits, the number depending on the ECC algorithm utilized.

Memory 118 can include array logic 120, non-volatile memory cell array 122, and memory cell array 123. Non-volatile memory cell array 122 may include a variety of non-volatile memory structures and technologies. Examples of non-volatile memory technologies include flash memories (e.g., NAND, NOR, Multi-Level Cell (MLC), Divided bit-line NOR (DINOR), AND, high capacitive coupling ratio (HiCR), asymmetrical contactless transistor (ACT), other flash memories), erasable programmable read-only memory (EPROM), electrically-erasable programmable read-only memory (EEPROM), read-only memory (ROM), one-time programmable memory (OTP), and other memory technologies.

In an embodiment, memory 118 may additionally include memory cell array 123 that is configured to store a buffer. The buffer is configured to store data in a phased garbage collection operation. As will be explained in more detail below, in a phased garbage collection operation, new data received from a write command can be stored in the buffer. It should be appreciated that the buffer also may be located in RAM 112 and/or non-volatile memory cell array 122, in accordance with embodiments of the present invention. Similar to non-volatile memory cell array 122, memory cell array 123 may include a variety of memory structures and technologies. Since memory cell array 123 is configured for buffering operations, the memory cell array may incorporate a different memory structure that may be faster, more economical, and more reliable than non-volatile memory array 122.

Array logic 120 interfaces memory controller 110 with non-volatile memory cell array 122 and memory cell array 123 and can provide, for example, addressing, data transfer and sensing, and other support to the non-volatile memory cell array and the memory cell array. To support non-volatile memory cell array 122 and memory cell array 123, array logic 120 can include row decoders, column decoders, charge pumps, word line voltage generators, page buffers, input/output buffers, address buffers, and other circuitries.

Figure 2:
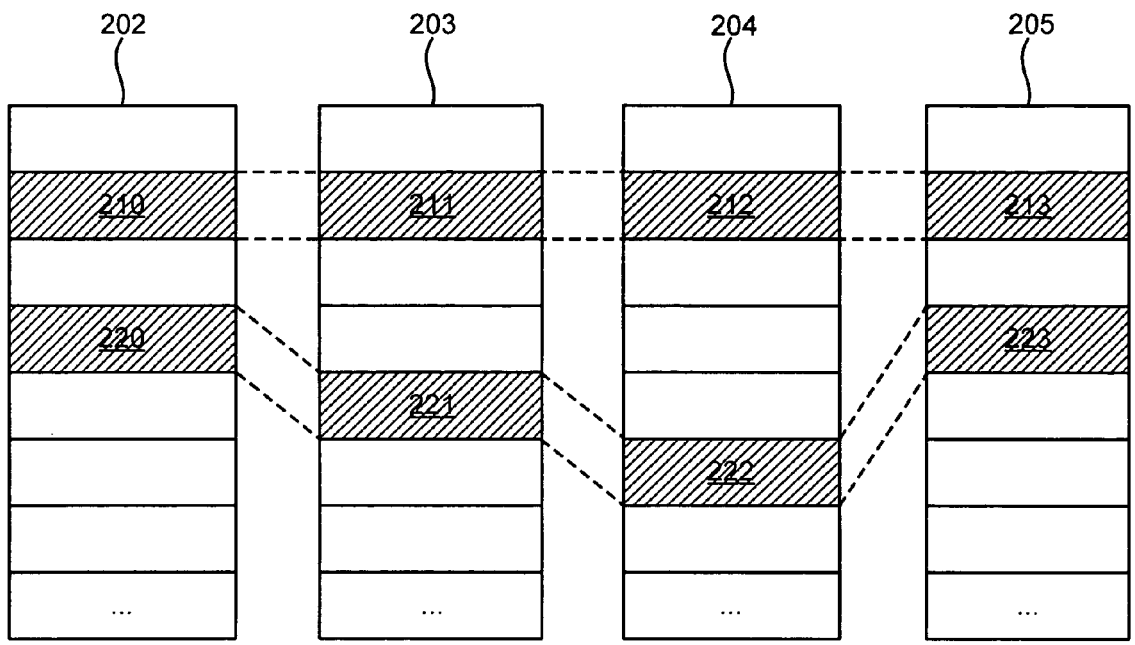
FIG. 2 is a simplified block diagram of an organization of the memory cell array into planes.

FIG. 2 is a simplified block diagram of an organization of the memory cell array into planes. One or more memory arrays may be divided into multiple planes or sub-arrays. In the example of FIG. 2, a memory cell array is divided into four planes 202-205. It should be appreciated that other number of planes, such as 1, 2, 8, 16, or more, can exist in a non-volatile memory storage system. Each plane 202, 203, 204, or 205 may be divided into blocks of memory cells, such as blocks 210-213 and 220-223, located in respective planes 202-205. A block of memory cells is the smallest number of memory cells that are physically erasable together. For increased parallelism, the blocks can be operated in larger metablock units where one block from each plane 202, 203, 204, or 205 is logically linked together to form a metablock. For example, four blocks 210-213 can be logically linked together to form a metablock. Further, the blocks used to form a metablock can be from various locations within their respective planes, such as planes 202-205. For example, four blocks 220-223 from various locations within their respective planes 202-205 can be logically linked together to form another metablock. A metablock may extend across all four logical planes 202-205 within the non-volatile memory storage system or the non-volatile memory storage system can dynamically form metablocks from one or more blocks in one or more different planes.

Figure 3:
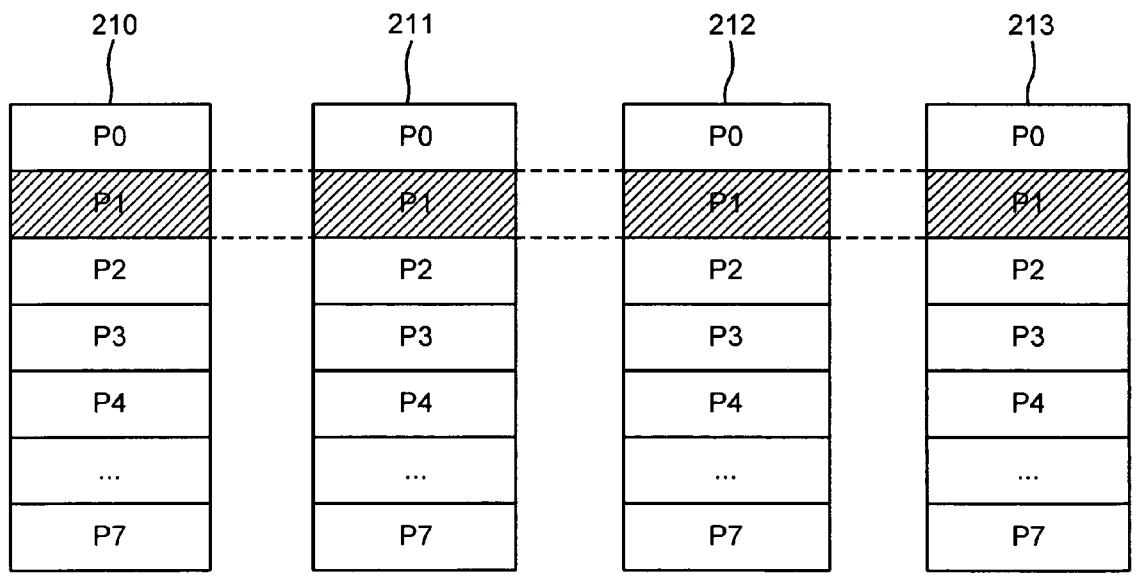
FIG. 3 is a simplified block diagram of pages of memory cells.

FIG. 3 is a simplified block diagram of pages of memory cells. Each block, such as blocks 210-213, is further divided into pages of memory cells. As shown in FIG. 3, each block 210, 211, 212, or 213 is divided into eight pages P0-P7. Alternatively, there can be 16, 32, or more pages of memory cells within each block 210, 211, 212, or 213. To increase the operational parallelism of the non-volatile memory storage system, the pages within two or more blocks may be logically linked into metapages. For example, a metapage can be formed of one page, such as P1, from each of four blocks 210-213. A metapage can extend across all planes within the non-volatile memory storage system or the non-volatile memory storage system can dynamically form metapages from one or more pages in one or more separate blocks in one or more different planes.

Figure 4:
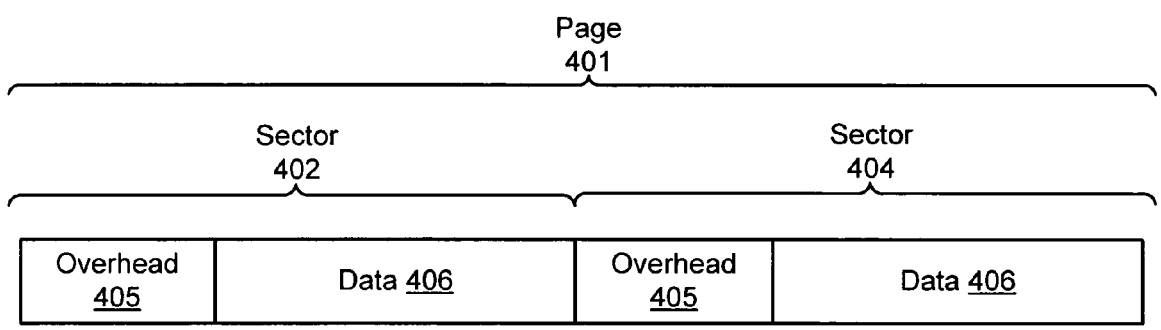
FIG. 4 is a simplified block diagram of sectors of memory cells.

FIG. 4 is a simplified block diagram of sectors of memory cells. A page can be further divided into one or more sectors. The amount of data in each page can be an integer number of one or more sectors of data, where each sector may store 512 bytes of data. FIG. 4 shows page 401 divided into two sectors 402 and 404. Each sector 402 or 404 contains data 406, which can be 512 bytes in size, and overhead data 405 associated with the data. The size of overhead data 405 can be 16 bytes and can store, for example, an ECC calculated from data 406 during programming, the logical address associated with the data, a count of the number of times the block has been erased and re-programmed, control flags, operating voltage levels, and other information associated with the data.

Figure 5:
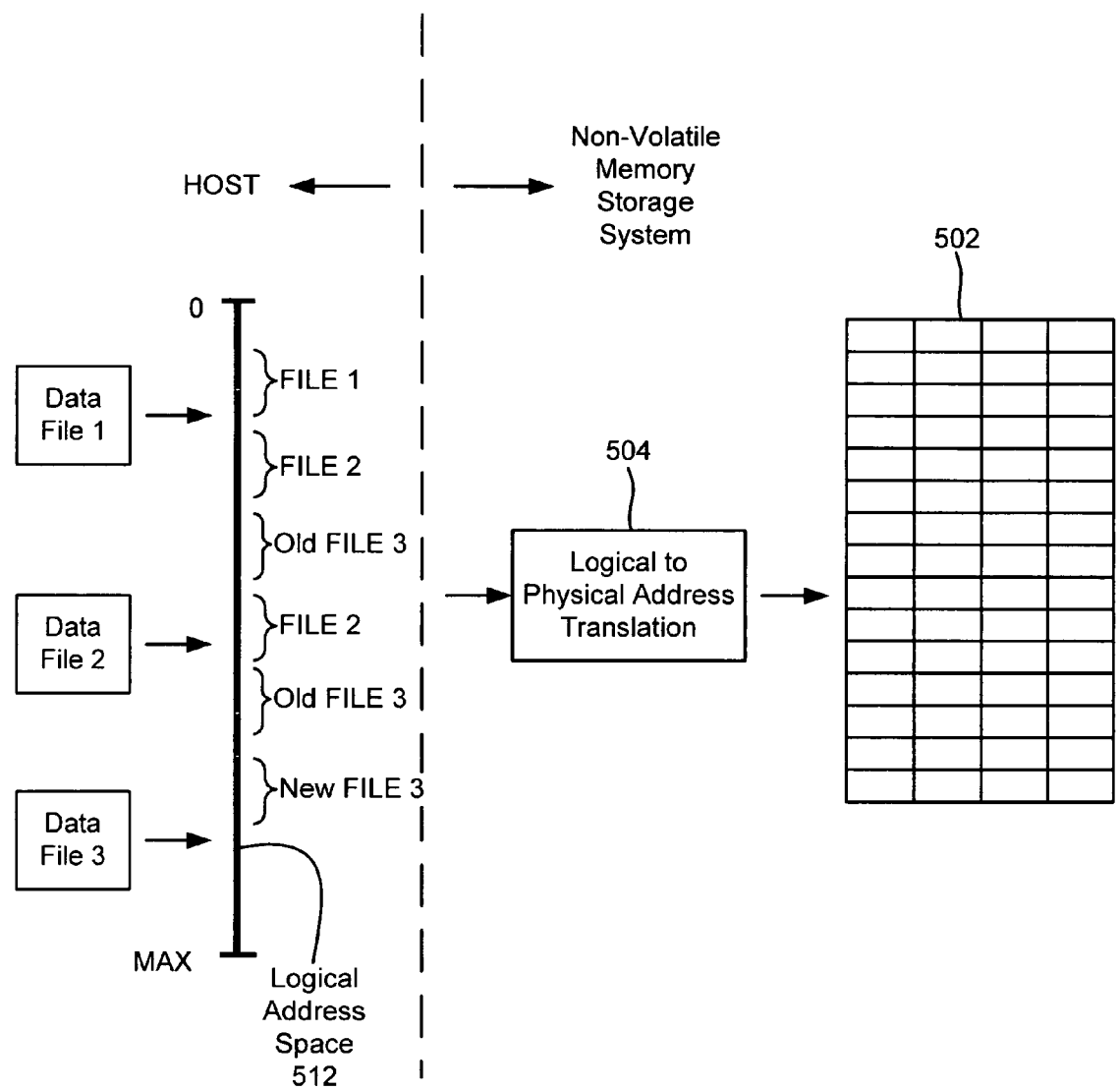
FIG. 5 is a simplified block diagram of a logical interface between a host and a non-volatile memory storage system.

FIG. 5 is a simplified block diagram of a logical interface between a host and non-volatile memory storage system. A continuous logical address space 512 provides addresses for data that can be stored in memory. Logical address space 512 as viewed by the host can be divided into increments of clusters of data. Each cluster may include a number of sectors of data, such as between 4 and 64 sectors.

As shown in FIG. 5, an application program executed on the host creates three data files 1, 2, and 3. Files 1, 2, and 3 can be an ordered set of data and are identified by a unique name or other reference. The host assigns a logical address space to file 1 that is not already located to other files. Here, file 1 is shown to have been assigned a continuous range of available logical addresses.

When host creates file 2 after file 1, the host similarly assigns two different ranges of continuous addresses within logical address space 512. Host may not assign a continuous logical address to a file, such as file 1, 2, or 3, but can rather assign fragments of logical addresses in between logical address ranges already allocated to other files. The example of FIG. 5 shows that another file 3 is allocated a non-continuous address range within logical address space 512, which is not previously allocated to files 1 and 2 and other data.

The host can keep track of logical address space 512 by maintaining a file allocation table (FAT), where the logical addresses assigned by the host to the various data files, such as files 1-3, by conversion are maintained. The host references files 1-3 by their logical addresses and not by the physical locations where the non-volatile memory storage system stores the files. On the other hand, the non-volatile memory storage system references files 1-3 by portions of the logical addresses to which data have been written and does not reference the files by the logical addresses allocated to the files. The non-volatile memory storage system converts the logical addresses provided by the host into unique physical addresses within memory cell array 502 where data from the host are stored. Block 504 represents a table of these logical-to-physical address conversions, which is maintained by the non-volatile memory storage system.

Figure 6:
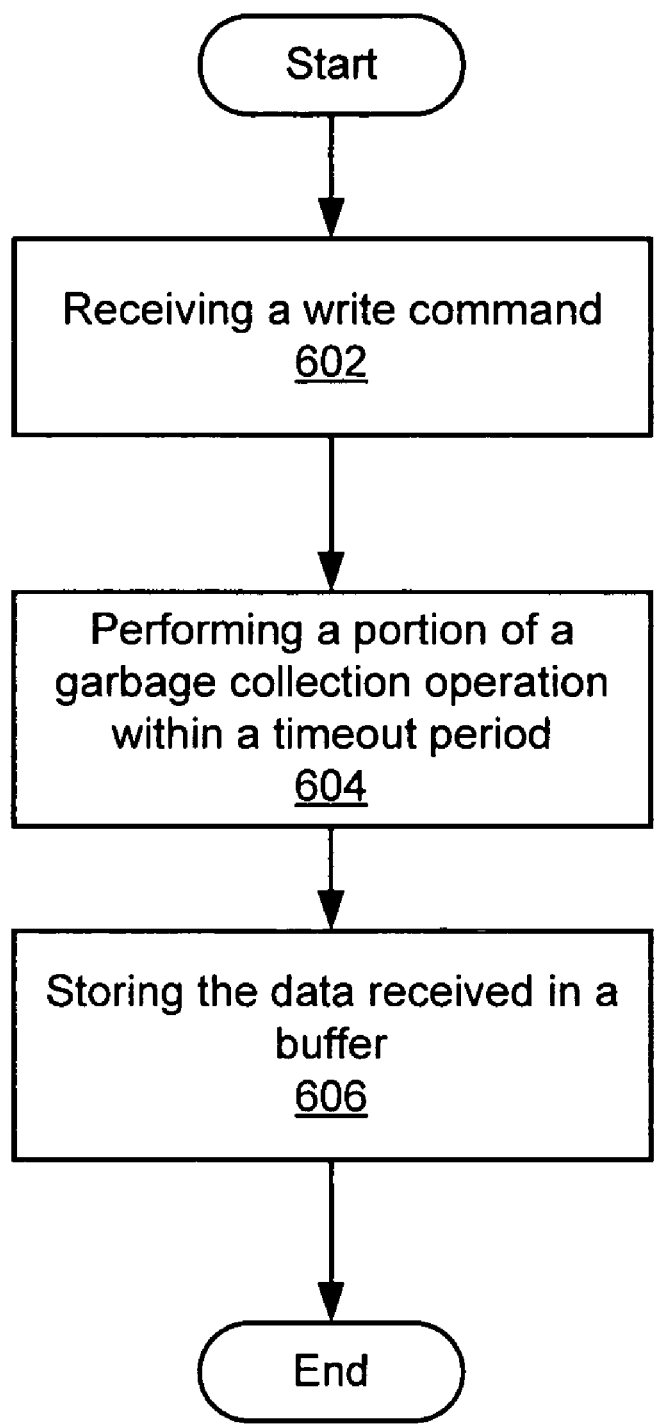
FIG. 6 is a flowchart diagram of a general overview of operations for phased garbage collection, in accordance with an embodiment of the present invention.

FIG. 6 is a flowchart diagram of a general overview of operations for phased garbage collection, in accordance with an embodiment of the present invention. It should be appreciated that data stored at specific host logical addresses can be overwritten by new data as the original stored data become obsolete. The non-volatile memory storage system, in response, writes the new data in an update block and then changes the logical-to-physical address table for those logical addresses to identify the new physical block to which the new data are stored. The blocks containing the original data at those logical addresses are then erased and made available for the storage of additional data. Such erasure can take place before a write operation. As a result, the memory controller learns that data at a given logical address has been rendered obsolete or invalid by the host after the new data are written to the same logical address. Many blocks of memory can therefore be storing invalid data for a period of time.

The sizes of blocks and metablocks are increasing and these increases result in a large proportion of individual data writes storing an amount of data that is less than the storage capacity of a metablock, and in many instances, even less than that of a block. Since the non-volatile memory storage system can direct new data to an erased pool metablock, such direction can result in portions of blocks or metablocks being unfilled. If the new data are updates of some data stored in another metablock, remaining valid metapages of data from that other metablock having logical addresses contiguous with those of the new data metapages are also copied in logical address order into the new metablock. The old metablock may retain other valid data metapages. Accordingly, data of certain metapages of an individual metablock can be rendered obsolete or invalid, and replaced by new data with the same logical address being written to a different metablock.

In order to maintain enough physical memory space to store data over a logical address space, such data can be periodically garbage collected (i.e., compacted or consolidated). In general, a garbage collection operation involves reading the valid data from a block and writing the valid data to a new block, ignoring invalid data in the process. For example, in the block diagram of FIG. 5, the creation of new data file 3 makes old data file 3 obsolete. Old data file 3 can be erased to reclaim the physical capacity used by old data file 3. However, such erase operation would trigger a garbage collection operation if file 2 and old file 3 are stored in the same physical block.

Returning to FIG. 6, the non-volatile memory storage system may perform the garbage collection operation within a timeout period allocated to a write command. If the garbage collection operation cannot be completed within one timeout period, then the one garbage collection operation may be split into several different phases (or portions), in accordance with an embodiment of the present invention. Here, the non-volatile memory storage system performs portions of the garbage collection operation using the timeout periods allocated to multiple write commands. In other words, the non-volatile memory storage system utilizes the timeout periods allocated to multiple write commands to perform portions of one garbage collection operation.

As shown in FIG. 6, a write command to write new data is received in operation 602. As used herein, the term "new data" is defined as the data received by the non-volatile memory storage system from a write command to be written to the memory. The write command is allocated a timeout period to complete the execution of the write command. In other words, the timeout period is a period of time allocated for an execution of the write command. An example of a timeout period allocated is 250 milliseconds. The write command can be a single sector write command or a multiple sectors write command. As will be explained in more detail below, in a single sector write command, new data can be written as single sectors to random addresses across a memory. In a multiple sectors write command, multiple sectors of new data having contiguous logical addresses are written to the memory.

Figure 7:
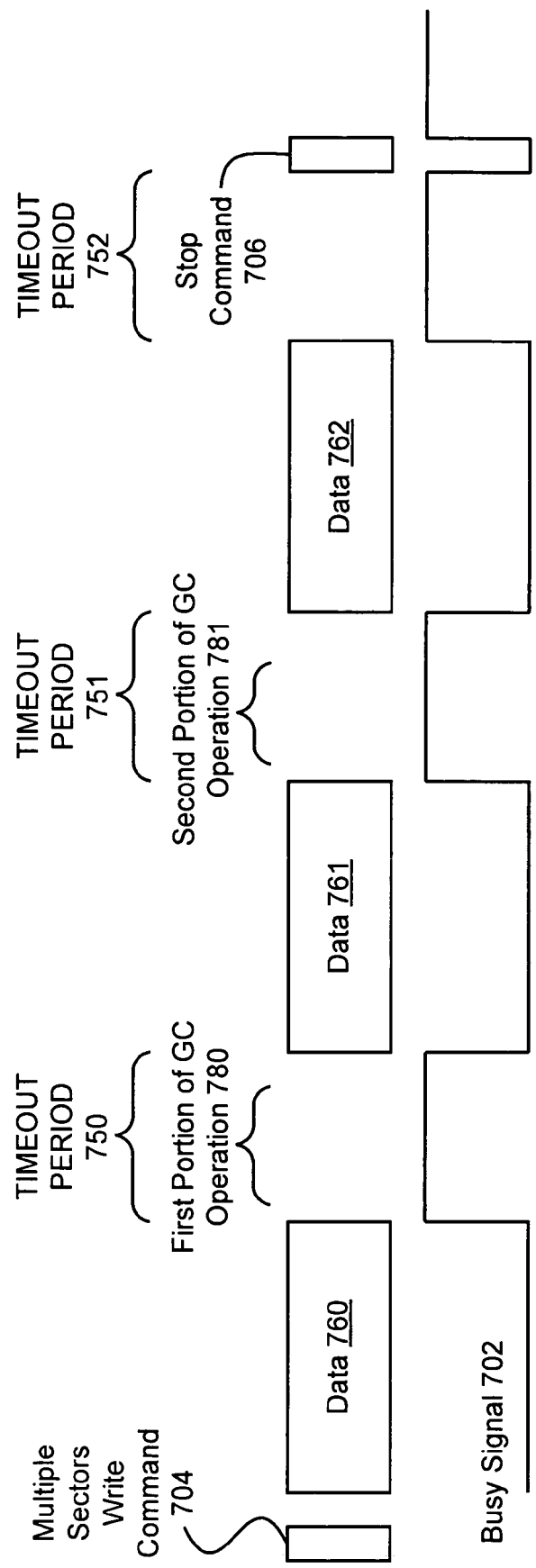
FIG. 7 shows a simplified block diagram of one garbage collection operation split into multiple portions, in accordance with an embodiment of the invention.

If one garbage collection operation cannot be completed within the timeout period, as shown in operation 604, a portion of the garbage collection operation is performed within the timeout period allocated to the write command. The remaining portions of the garbage collection can be completed at later timeout periods. For example, FIG. 7 shows a simplified block diagram of an example of one garbage collection operation split into multiple portions 780 and 781, in accordance with an embodiment of the invention. As shown in FIG. 7, a non-volatile memory storage system receives multiple sectors write command 704 and subsequently, multiple sectors of new data 760-762 are received for storage into memory. Busy signal 702 is asserted after each sector of data 760, 761, or 762 is received. The non-volatile memory storage system asserts busy signal 702 to allow the execution of the write command, which may include garbage collection operation (if needed), and other operations. A host does not send another command or additional data to the non-volatile memory storage system when busy signal 702 is asserted. The non-volatile memory storage system can assert busy signal 702 for a limited amount of time after each sector of data 760, 761, or 762 is received because the host allows a limited fixed amount of time (i.e., timeout periods 750-752) for the execution of the write command. If the busy signal remains active for longer than timeout period 750, 751, or 752, the host may repeat the write command or abort the process. Accordingly, the non-volatile memory storage system cannot assert busy signal 702 for more than timeout period 750, 751, or 752. Releasing busy signal 702 after the completion of writing multiple sectors of data 760-762 allows the host to communicate further with the non-volatile memory storage system.

Still referring to FIG. 7, portions 780 and 781 of the garbage collection can be allocated between multiple timeout periods 750-752. In other words, the non-volatile memory storage system can utilize each timeout period 750, 751, or 752 to perform each portion 780 or 781 of one garbage collection operation. For example, first portion 780 of one garbage collection is performed during first timeout period 750. Here, a portion of valid data can be copied from one block to another block during first timeout period 750. At second timeout period 751, the previous garbage collection operation started at first timeout period is continued. The non-volatile memory storage system performs second portion 781 of the previous garbage collection operation during timeout period 751 until the previous garbage collection is completed. The previous garbage collection can be completed by copying the remaining or last portion of the valid data from the one block to the other block. If the previous garbage collection operation cannot be completed within second timeout period 751, then the non-volatile memory storage system can use subsequent timeout periods, such as third timeout period 752, to complete the garbage collection operation. At the end of multiple sectors write command 704, the non-volatile memory storage system can assert busy signal 702 after stop command 706 is received until all sectors of data 760-762 are written to the memory cell array. It should be noted that FIG. 7 illustrates the operations associated with a multiple sectors write command. As will be explained in more detail below, the garbage collection operations performed may be different for single sector write commands and multiple sectors write command. For example, as will be explained in more detail below, the type of buffer used to store the new data depends on whether the write command received is a single sector write command or a multiple sectors write command.

Returning to FIG. 6, after a portion of the garbage collection operation is performed within a timeout period, the new data received from the write operation can be stored in a buffer associated with the non-volatile memory storage system in operation 606. In an embodiment, the buffer may be a data structure associated with the non-volatile memory cell array (e.g., non-volatile memory array 122 shown in FIG. 1). An example of a data structure include a block of the non-volatile memory cell array, such as a write buffer block, which will be described in more detail below. In another embodiment, the buffer may be a block of a volatile memory cell array. For example, the new data may be stored in a block located in the RAM associated with the non-volatile memory storage system (e.g., RAM 112 shown in FIG. 1). In still another embodiment, as discussed above, the new data may be stored in a block located in a separate memory cell array (e.g., memory cell array 123 shown in FIG. 1).

Figure 8:
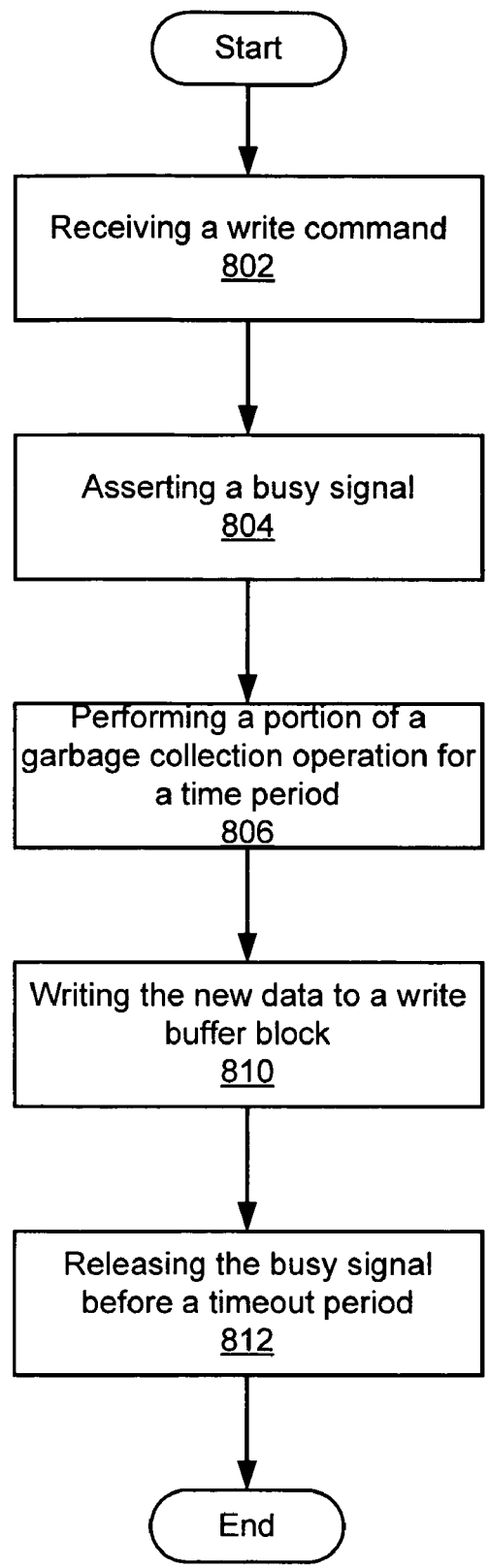
FIG. 8 is a flowchart diagram of detailed operations for performing a phased garbage collection, in accordance with an embodiment of the present invention.

FIG. 8 is a flowchart diagram of detailed operations for performing a phased garbage collection, in accordance with an embodiment of the present invention. As shown in FIG. 8, a write command is received in operation 802 to write new data to a memory. In an embodiment, the write command is a single sector write command. In some circumstances, as will be explained in more detail below, the write command can also be a multiple sectors write command, in accordance with another embodiment. After the write command is received, the non-volatile memory storage system asserts a busy signal in operation 804.

Before the write command is executed, a portion of the garbage collection operation is performed for a garbage collection time period in operation 806. For example, in an embodiment, one or more blocks are selected for garbage collection operation. The one or more blocks can include invalid data and/or valid data. The valid data are copied to a second block for a garbage collection time period. Depending on the garbage collection time period allocated to the garbage collection operation and on the amount of valid data that are to be copied, all the valid data or a portion of the valid data are copied to the second block. The garbage collection time period allocated for the garbage collection operation can be expressed as Garbage collection time period=Timeout Period–Tprog where timeout period, as discussed above, is a fixed, limited period of time. Tprog is the maximum programming time associated with writing the new data to memory (e.g., to a buffer) or is the maximum time the non-volatile memory storage system takes to write the new data to the memory. As a result, in an embodiment, the non-volatile memory storage system tracks the amount of time for copying the valid data from the one or more blocks to the second block. The non-volatile memory storage system stops the copy before the time exceeds the garbage collection time period.

If the garbage collection operation cannot be completed by the garbage collection time period, then the new data associated with the write command can be written to the write buffer block in operation 810. The non-volatile memory storage system can write the new data to the write buffer block before, during, or after the garbage collection operation. As will be explained in more detail below, the new data may be copied from the write buffer block to an update block upon completion of the garbage collection operation. The write buffer block is maintained in memory by the non-volatile memory storage system. In general, the write buffer block buffers new data in the non-volatile memory storage system. In an embodiment, the write buffer block spans multiple logical addresses. In another embodiment, the write buffer block spans an entire logical address space. By spanning the entire logical address space, the write buffer block can store data that are about to be written to all logical addresses and all groups of logical addresses (i.e., all logical groups) throughout the non-volatile memory storage system. In other words, new data associated with different logical groups can be stored in the write buffer block. A logical group is a group of logical addresses with a size that may equal to the size of a metablock. The new data can be written to the write buffer block in sequential or non-sequential (i.e., chaotic or random) order. As will be explained in more detail below, the write buffer block serves as a temporary buffer, as new data written to the write buffer block are later copied to another block (e.g., an update block). As used herein, the term "write buffer block cleaning" means that the new data stored in the write buffer block are copied to another block.

It should be noted that, in an embodiment, the non-volatile memory storage system uses the write buffer block for phased garbage collection operations. Accordingly, the write buffer block may not store the most updated new data. As a result, if the new data are read in a subsequent read operation, the non-volatile memory storage system checks which of the new data stored in either the update block or the write buffer block are the most recently updated. The read operation then accesses and returns the most recently updated new data. In another embodiment, the non-volatile memory storage system can use the write buffer block for both non-phased and phased garbage collection operations. Here, the write buffer block is used for all write operations. In other words, new data from non-phased and phased garbage collection operations are written to the write buffer block. Thus, the write buffer block operates like a write cache and therefore includes the most recently updated new data.

The index information associated with the write buffer block may be stored in a separate data structure, or as part of the write buffer block itself. The data structure may be stored in the RAM of the memory controller. The index information stored in the data structure allows tracking and access of data stored in the write buffer block. The index information, for example, can include a map of the logical addresses to locations in the write buffer block or pointers to valid indices of the write buffer block. The index information may be updated after an update block is closed or after a number of updates to the write buffer block. As will be explained in more detail below, in an embodiment, the write buffer block may be configured for a sector level index. In another embodiment, the write buffer block may be configured for a page boundary index. The write buffer block can also be compacted when full. For example, the valid data stored in the write buffer block are copied to a new block, which is to be referenced as a new write buffer block, and the existing write buffer block with obsolete entries is erased. As used herein, the term "write buffer compaction" means that the valid data stored in the write buffer block are compacted.

Still referring to FIG. 8, after the new data are written to the write buffer block and the garbage collection operation is performed for the garbage collection time period, the non-volatile memory storage system releases the busy signal before the timeout period in operation 812. Thus, the total time for executing the write command that includes one garbage collection operation or a portion of one garbage collection operation does not exceed the timeout period. If a portion of the garbage collection operation is performed within the timeout period, then the remaining portions are completed at subsequent timeout periods. When the garbage collection operation is complete, one or more blocks being garbage collected are erased and made available for the storage of additional data.

Figure 9A:
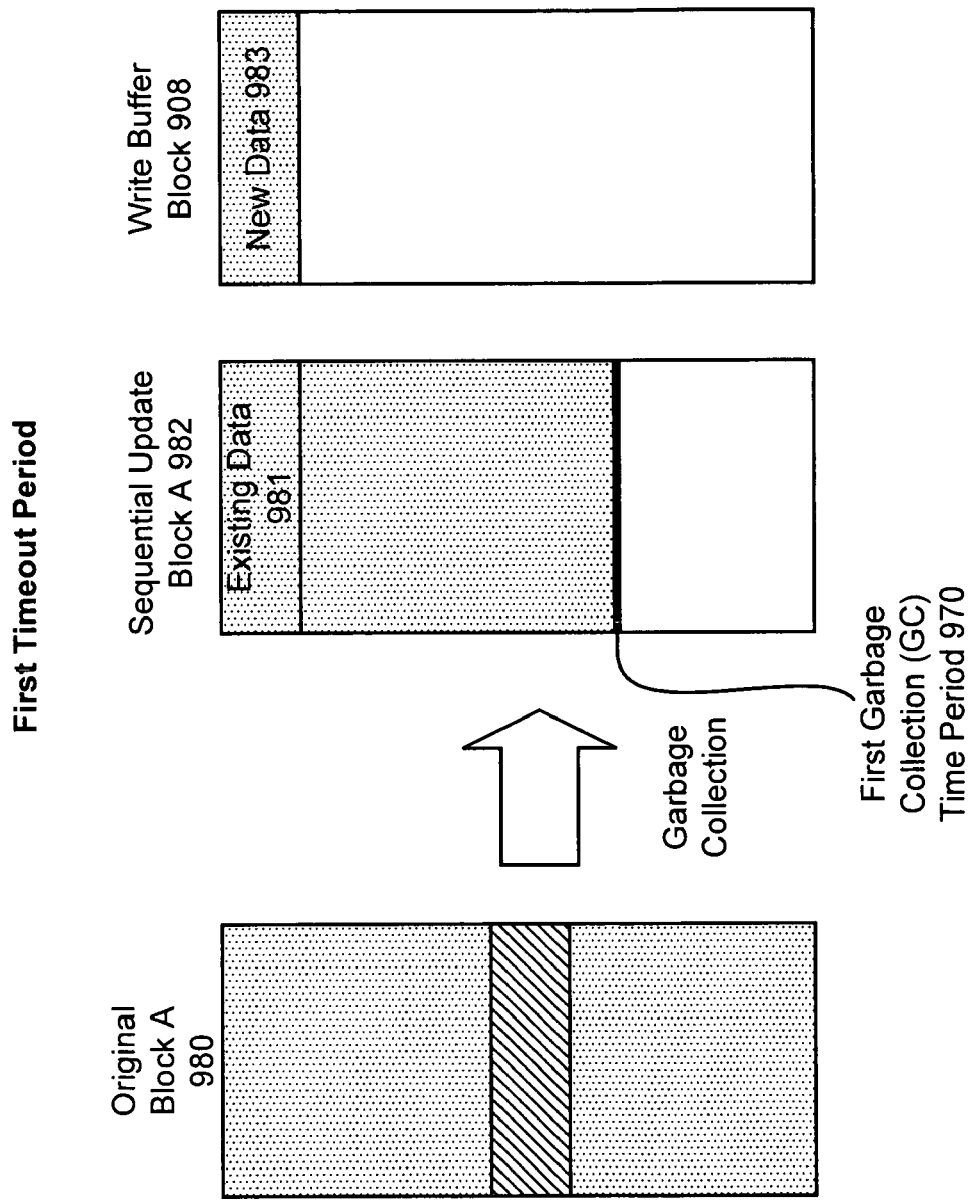
FIGS. 9A and 9B are simplified block diagrams of memory blocks with sequential update blocks being garbage collected in phases, in accordance with embodiments of the present invention.
Figure 9B:
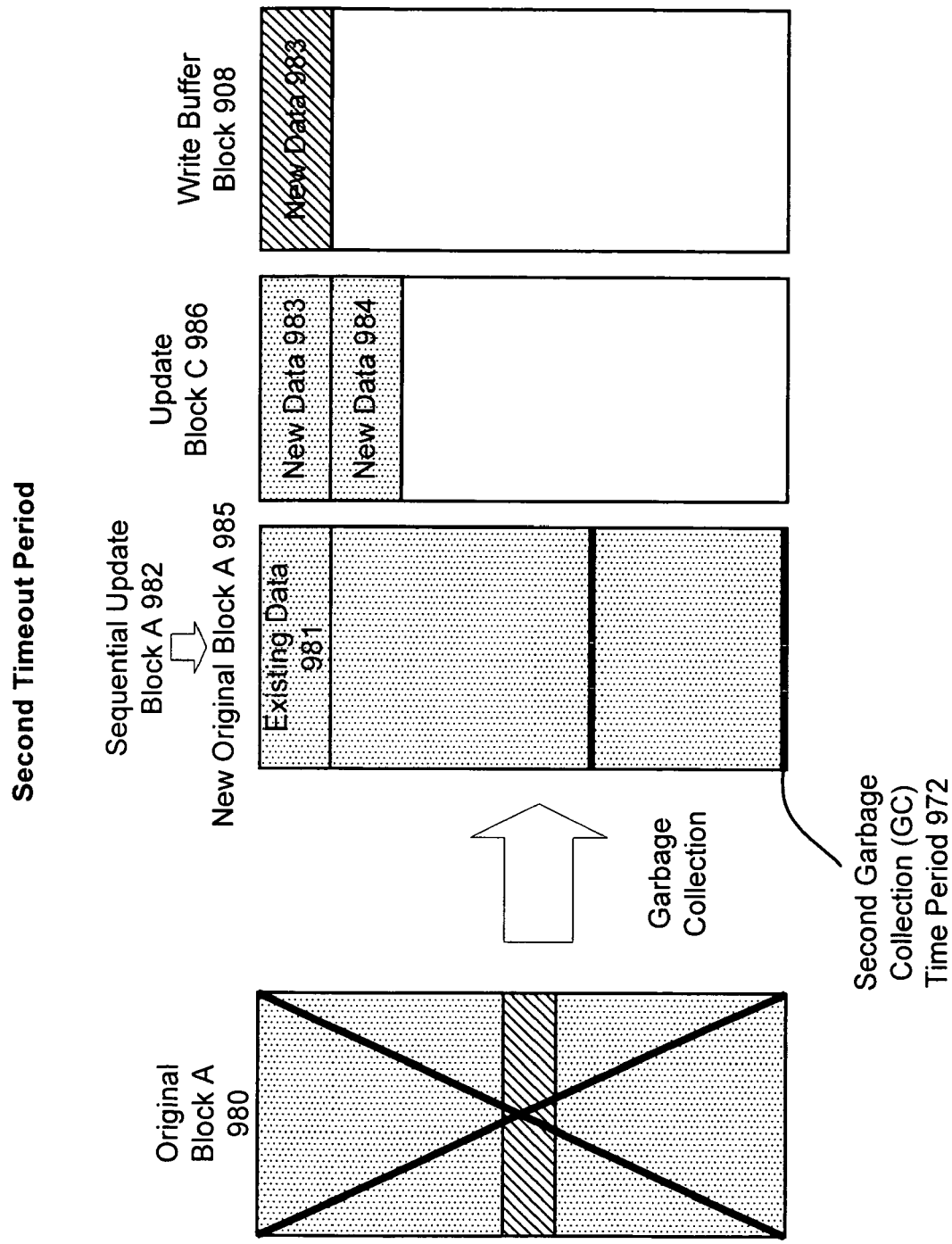

FIGS. 9A and 9B are simplified block diagrams of memory blocks with sequential update blocks being garbage collected in phases, in accordance with embodiments of the present invention. As shown in FIG. 9A, original block A 980 and associated sequential update block A 982 are selected for garbage collection. In general, data received from a write command may be written to an update block. A dedicated metablock can be assigned as an update block for each logical group within which data is being updated. It should be noted that logical sectors of data are stored in logical groups comprising a set of logically contiguous sectors. An update block can be managed to receive data in either sequential order or chaotic order (i.e., non-sequential order). It should be appreciated that a sequential update block, such as sequential update block A 982, is a metablock allocated when a write command is received from the host to write data that fills one or more physical page in a logical group for which all valid sectors are currently located in the same metablock. Sectors of data written to the sequential update block are written sequentially in logical addressing such that the sectors supersede the corresponding logical sectors written in the original block. A sector updated in this logical group can be written to this sequential update block, until the sequential update block is either closed or converted to a chaotic update block. It should be noted that the sequential update block is considered closed when the last physical sector location of the sequential update block is written. In other words, closure of the sequential update block may result from the sequential update block being completely filled by updated sector data written by the host or copied from the original block. As will be explained in more detail below, the chaotic update block can be created by conversion from a sequential update block when a sector of data written by a host is logically non-sequential to the previously written sector of data within the logical group being updated.

Original block A 980 can include invalid and valid data, which is represented in FIG. 9A by hatched pattern and dotted pattern, respectively. It should be noted that in addition to valid data copied from original block A 980, sequential update block A 982 additionally includes existing data 981 that were written to the sequential update block A before the garbage collection operation. When a write command to write new data 983 is received, the write command may trigger the closure of sequential update block A 982, which is a type of garbage collection operation, because the new data are associated with a logical group that does not have an open update block or that the new data invoke a garbage collection operation. The non-volatile memory storage system asserts a busy signal and then copies the valid data from original block A 980 to sequential update block A 982 until first garbage collection time period 970 is reached. During copying, the non-volatile memory storage system tracks the time, and the non-volatile memory storage system stops the copy operation before first garbage collection time period 970 is exceeded. As shown in FIG. 9A, the garbage collection operation cannot be completed within first garbage collection time period 970 as there are still valid data remaining in original block A 980. As a result, after the portion of valid data are copied to sequential update block A 982, new data 983 are written to write buffer block 908 within the remaining time allowed before first timeout period is reached.

FIG. 9B shows that the remaining portion of the garbage collection operation can be completed within a second timeout period. Here, a second write command to write new data 984 is received after the first write command. As a result, a second timeout period is allocated to the second write command. During the second timeout period, the remaining valid data are copied from original block A 980 to sequential update block A 982. In this example, all the remaining valid data (or last portion of the valid data) can be copied to sequential update block A 982 within second garbage collection time period 972. Accordingly, the garbage collection operation can be completed within the second timeout period. Since sequential update block A 982 is filled, the sequential update block A is converted to new original block A 985 or a non-update block. Original block A 980 is erased and can be made available for the storage of additional data because the garbage collection operation is completed in this second timeout period. After original block A 980 is erased, update block C 986 is allocated and new data 984 received from the second write command are written to the newly allocated update block C. It should be noted that update block C 986 may or may not be associated with new original block A 985.

After the garbage collection is completed within the second timeout period, the non-volatile memory storage system may conduct a write buffer block cleaning operation if there is time available within the second timeout period. Write buffer block 908 serves as a temporary buffer, as new data, such as new data 983, written to the write buffer block are later copied to another block (e.g., updated block C 986). In the example of FIG. 9B, there is time for a write buffer block cleaning operation within the second timeout period. New data 983, which are stored in write buffer block 908, are in the same logical group as new data 984. Therefore, new data 983 are copied to update block C 986 after the completion of the garbage collection operation. New data 983 stored in write buffer block 908 are marked as invalid and therefore, additional space in the write buffer block could be made available for the storage of additional new data. It should be noted that a write buffer block cleaning operation may not be performed after the completion of every garbage collection operation. The timing of the write buffer block cleaning will be explained in more detail below.

Figure 10A:
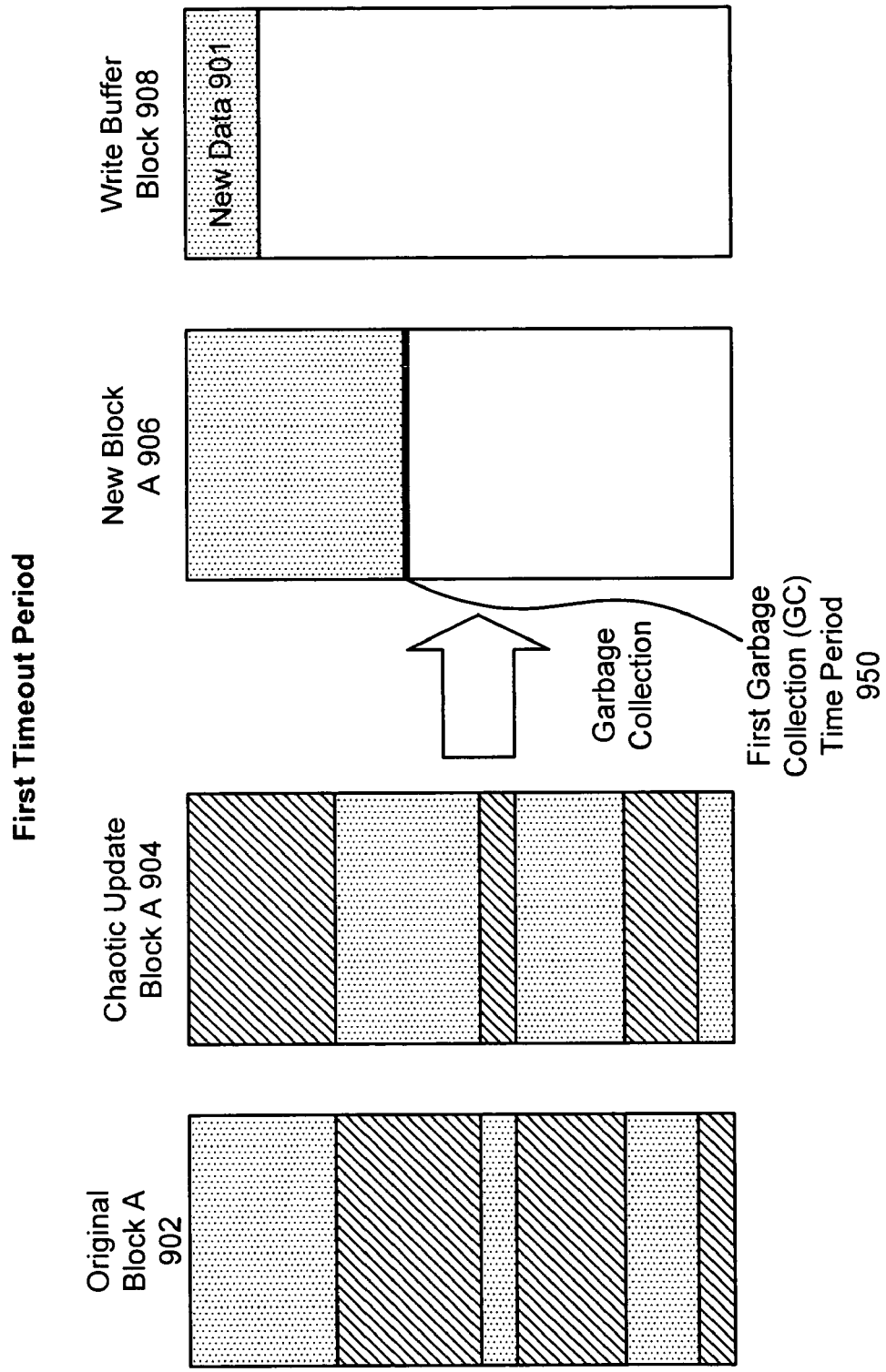
FIGS. 10A, 10B, 10C, 10D, and 10E are simplified block diagrams of memory blocks with chaotic update blocks being garbage collected in phases, in accordance with embodiments of the present invention.

FIGS. 10A-10E are simplified block diagrams of memory blocks with chaotic update blocks being garbage collected in phases, in accordance with embodiments of the present invention. As shown in FIG. 10A, original block A 902 and chaotic update block A 904 are selected for garbage collection. In general, a chaotic update block, such as chaotic update block A 904, allows sectors of data to be updated in a random order within a logical group, and with any repetition of individual sectors. The chaotic update block can be created by conversion from a sequential update block when a sector of data written by a host is logically non-sequential to the previously written sector of data within the logical group being updated. All sectors of data subsequently updated in this logical group are written in the next available sector location in the chaotic update block, whatever their logical sector address within the group.

Here, original block A 902 and chaotic update block A 904 include invalid and valid data, which is represented in FIG. 10A by a hatched pattern and a dotted pattern, respectively. When a write command to write new data 901 is received, the non-volatile memory storage system asserts a busy signal and then copies the valid data from original block A 902 and chaotic update block A 904 to new block A 906 until first garbage collection time period 950 is reached. During copying, the non-volatile memory storage system tracks the time, and the non-volatile memory storage system stops the copy operation before first garbage collection time period 950 is exceeded. As shown in FIG. 10A, the garbage collection operation cannot be completed within first garbage collection time period 950 as there are still valid data remaining in original block A 902 and chaotic update block A 904. As a result, after the portion of the valid data are copied to new block A 906, new data 901 received before the garbage collection operation started are written to write buffer block 908 before first timeout period is reached.

Figure 10B:
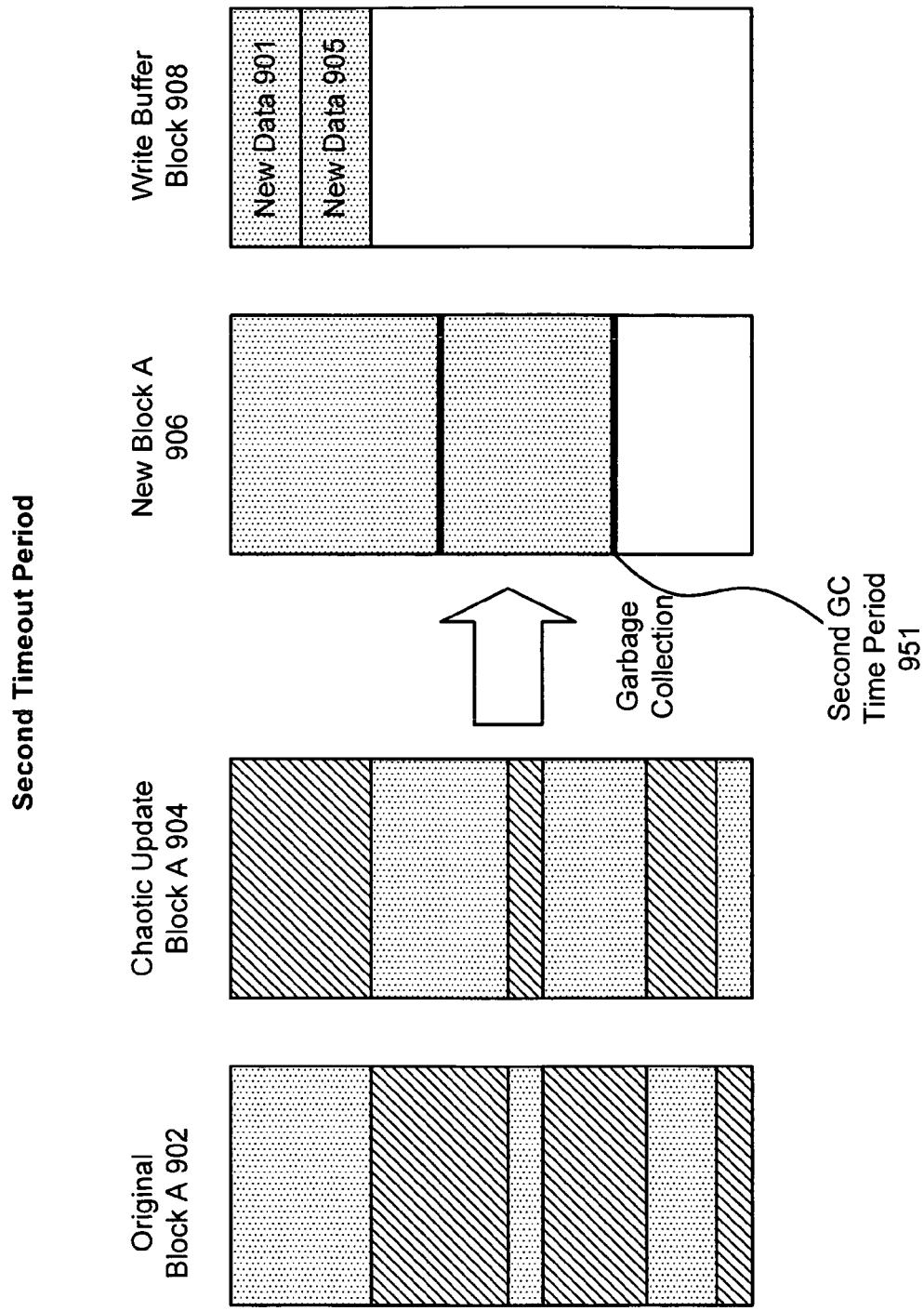

FIG. 10B shows the continuation of the garbage collection operation at a subsequent timeout period. Here, a second write command is received after the first write command and a second timeout period is allocated to the second write command. During the second timeout period, the remaining valid data are copied from original block A 902 and chaotic update block A 904 to new block A 906 until second garbage collection time period 951 is reached. As shown in FIG. 10B, the garbage collection operation cannot be completed within second garbage collection time period 951 as there are still valid data remaining in original block A 902 and chaotic update block A 904. Thus, after the portion of valid data are copied to new block A 906, new data 905 received before the garbage collection operation started are written to write buffer block 908.

Figure 10C:
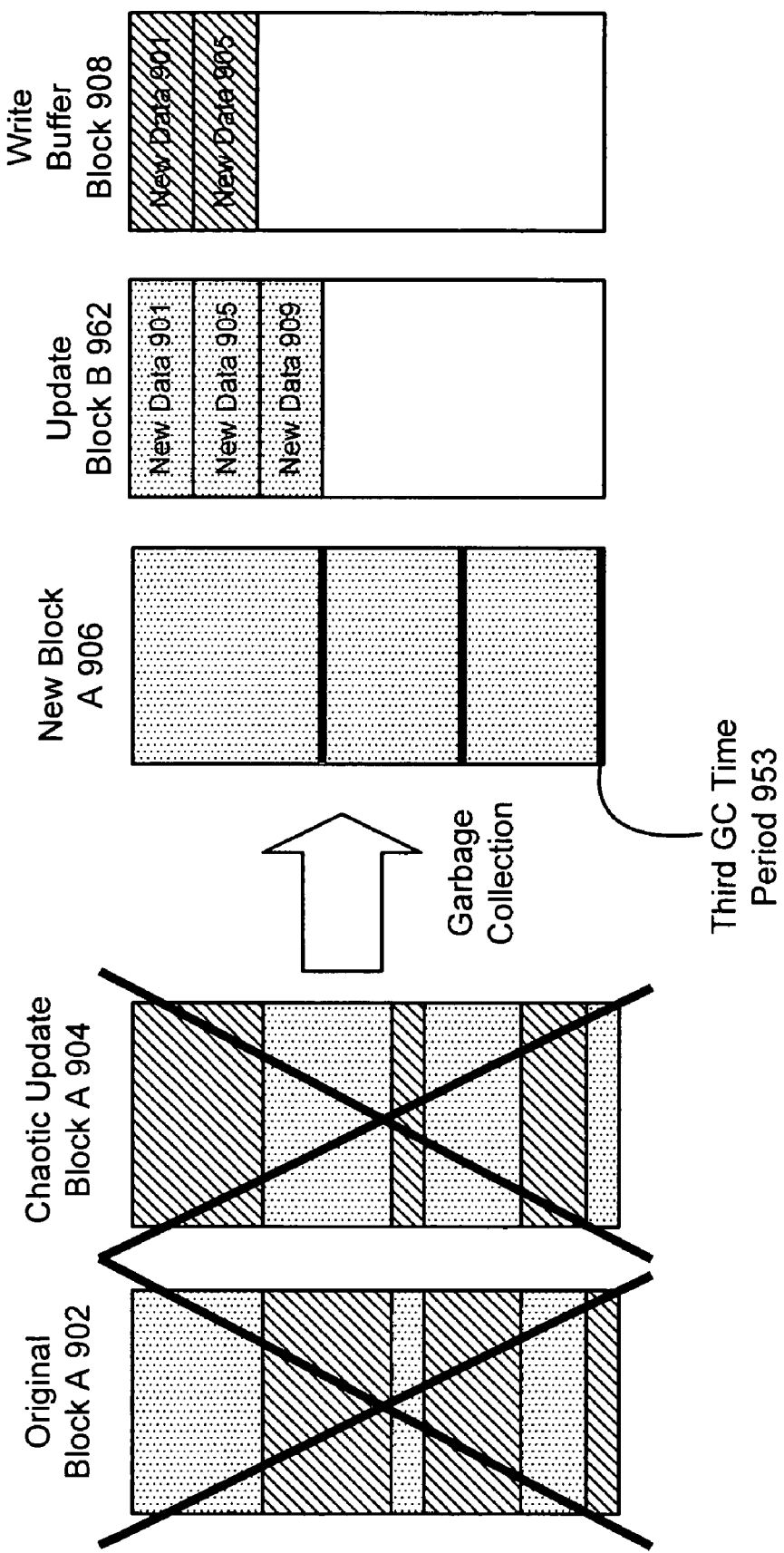

FIG. 10C shows that the remaining portion of the garbage collection operation can be completed in a third timeout period. A third write command is received after the second write command. As a result, a third timeout period is allocated to the third write command. During the third timeout period, the remaining valid data are copied from original block A 902 and chaotic update block A 904 to new block A 906. Here, all the remaining valid data (or last portion of the valid data) can be copied to new block A 906 within third garbage collection time period 953. Accordingly, the garbage collection operation can be completed within the third timeout period. Since the garbage collection operation is completed in this third timeout period, original block A 902 and chaotic update block A 904 may be erased and made available for the storage of additional data. After original block A 902 and chaotic update block A 904 are erased, new update block B 962 is allocated and new data 909 received from the third write command are written to the newly allocated update block B. New data 909 is not written to write buffer block 908 because the garbage collection operation is completed and there is no need to buffer the new data until a subsequent timeout period. In this example, a write buffer block cleaning operation is performed where new data 901 and 905 stored in write buffer block 908 are copied to update block B 962, assuming that new data 901, 905, and 909 belong to the same logical group.

Figure 10D:
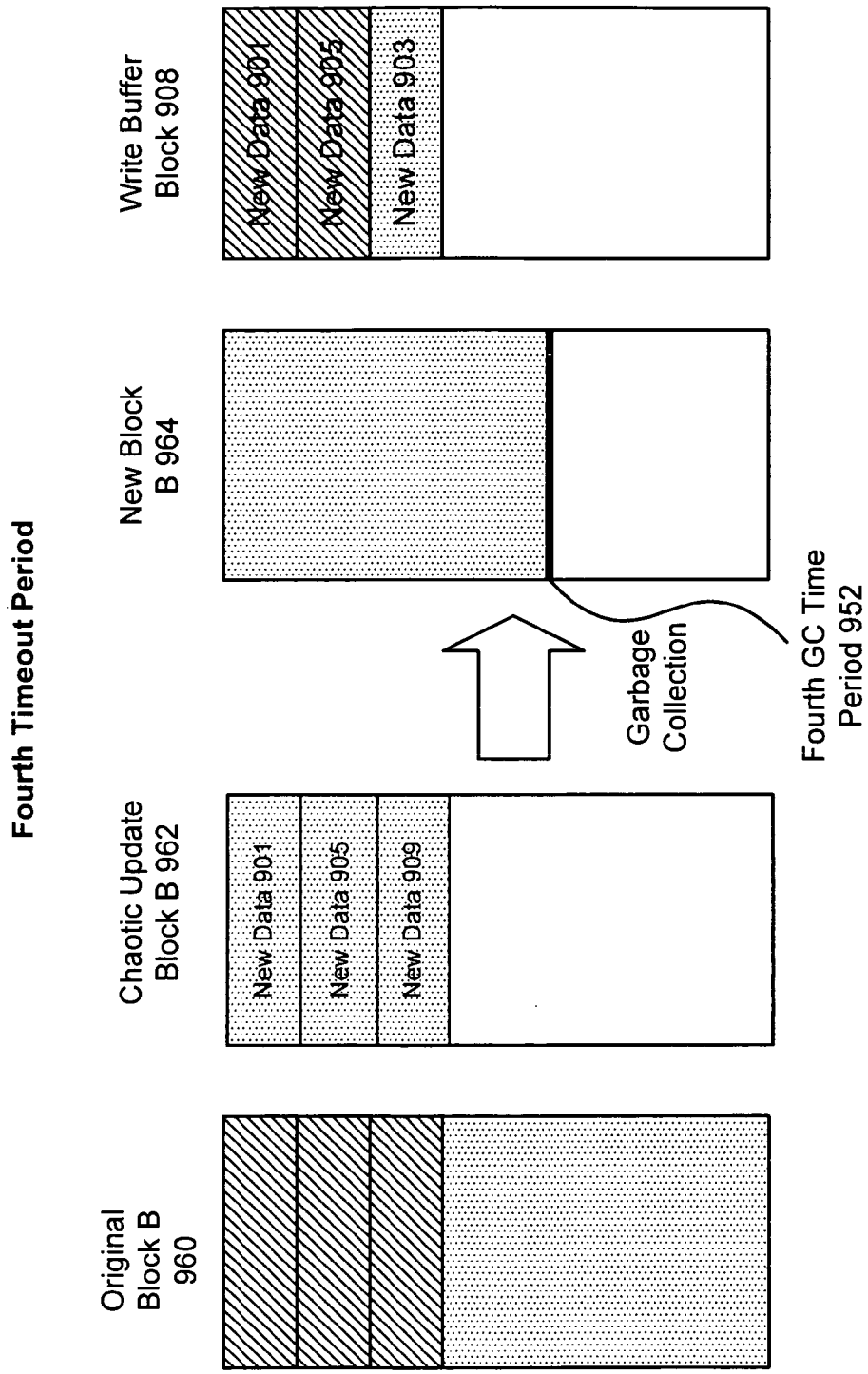

FIG. 10D shows another garbage collection operation being conducted during a fourth timeout period. As shown in FIG. 10D, original block B 960 and chaotic update block B 962 are selected for garbage collection. Update block B 962, which has been converted into a chaotic update block, includes new data 901, 905, and 909 associated with the first, second, and third write commands. When a fourth write command is received, the non-volatile memory storage system asserts a busy signal and then copies the valid data from original block B 960 and chaotic update block B 962 to new block B 964. As shown in FIG. 10D, the garbage collection operation cannot be completed within fourth garbage collection time period 952 as there are still valid data remaining in original block B 960 and chaotic update block B 962. After the portion of the valid data are copied to new block B 964, new data 903 received from the fourth write command are written to write buffer block 908.

Figure 10E:
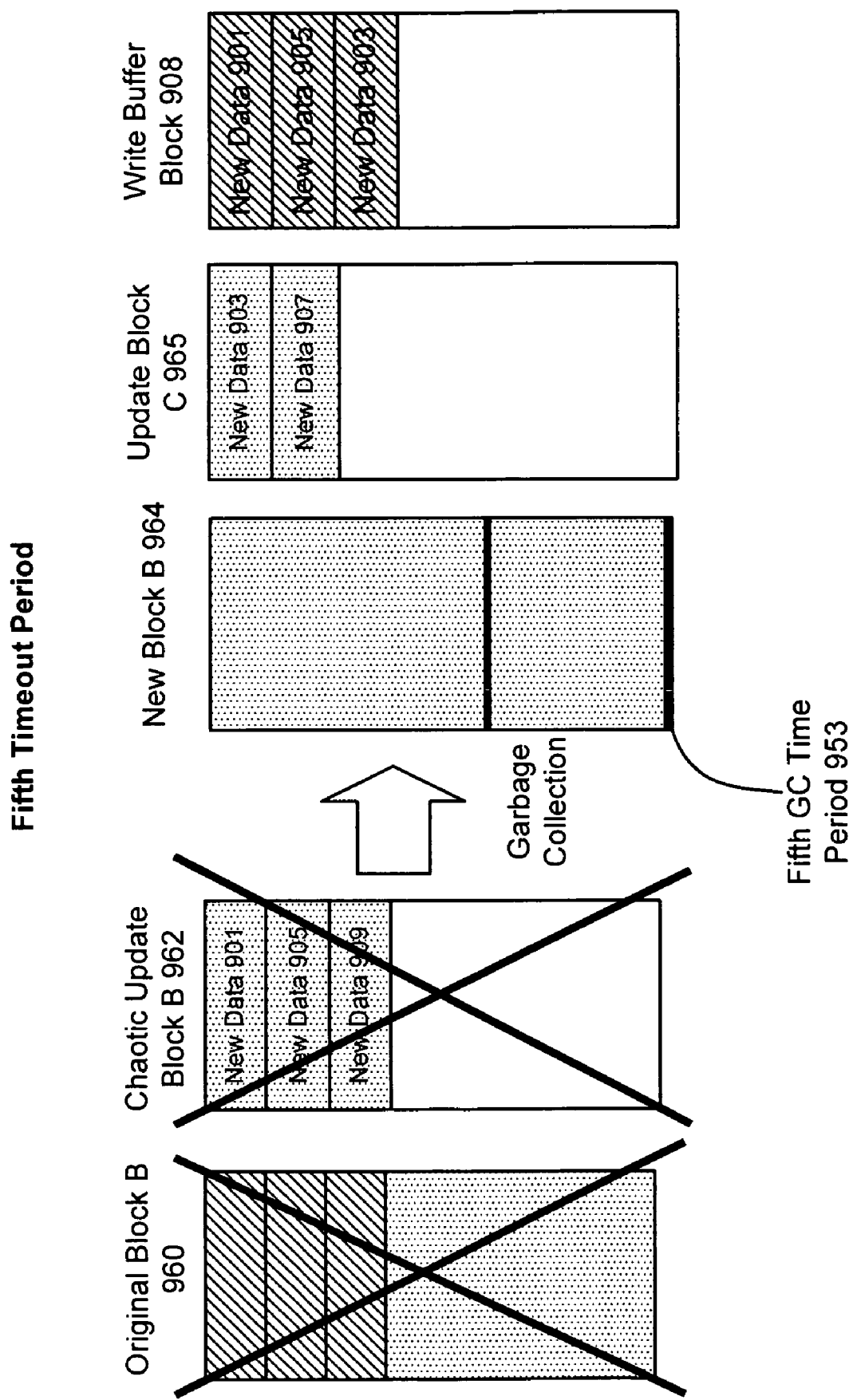

FIG. 10E shows that the remaining portion of the garbage collection operation of FIG. 10D can be completed in a fifth timeout period. A fifth write command is received after the fourth write command. As a result, a fifth timeout period is allocated to the fifth write command. During the fifth timeout period, the remaining valid data are copied from original block B 960 and chaotic update block B 962 to new block B 964. Here, all the remaining valid data (or last portion of the valid data) can be copied to new block B 964 within fifth garbage collection time period 953. Accordingly, the garbage collection operation initially performed during the fourth timeout period can be completed within the fifth timeout period. Since the garbage collection operation is completed in this fifth timeout period, original block B 960 and chaotic update block B 962 are erased and made available for the storage of additional data. After original block B 960 and chaotic update block B 962 are erased, update block C 965 is allocated and new data 907 received from the fifth write command are written to the newly allocated update block C. It should be noted that update block C 965 may or may not be associated with new block B 964. Here, a write buffer block cleaning operation is performed and thus, new data 903 stored in write buffer block 908 are copied to update block C 965, assuming that new data 903 and new data 907 belong to the same logical group.

Figure 11:
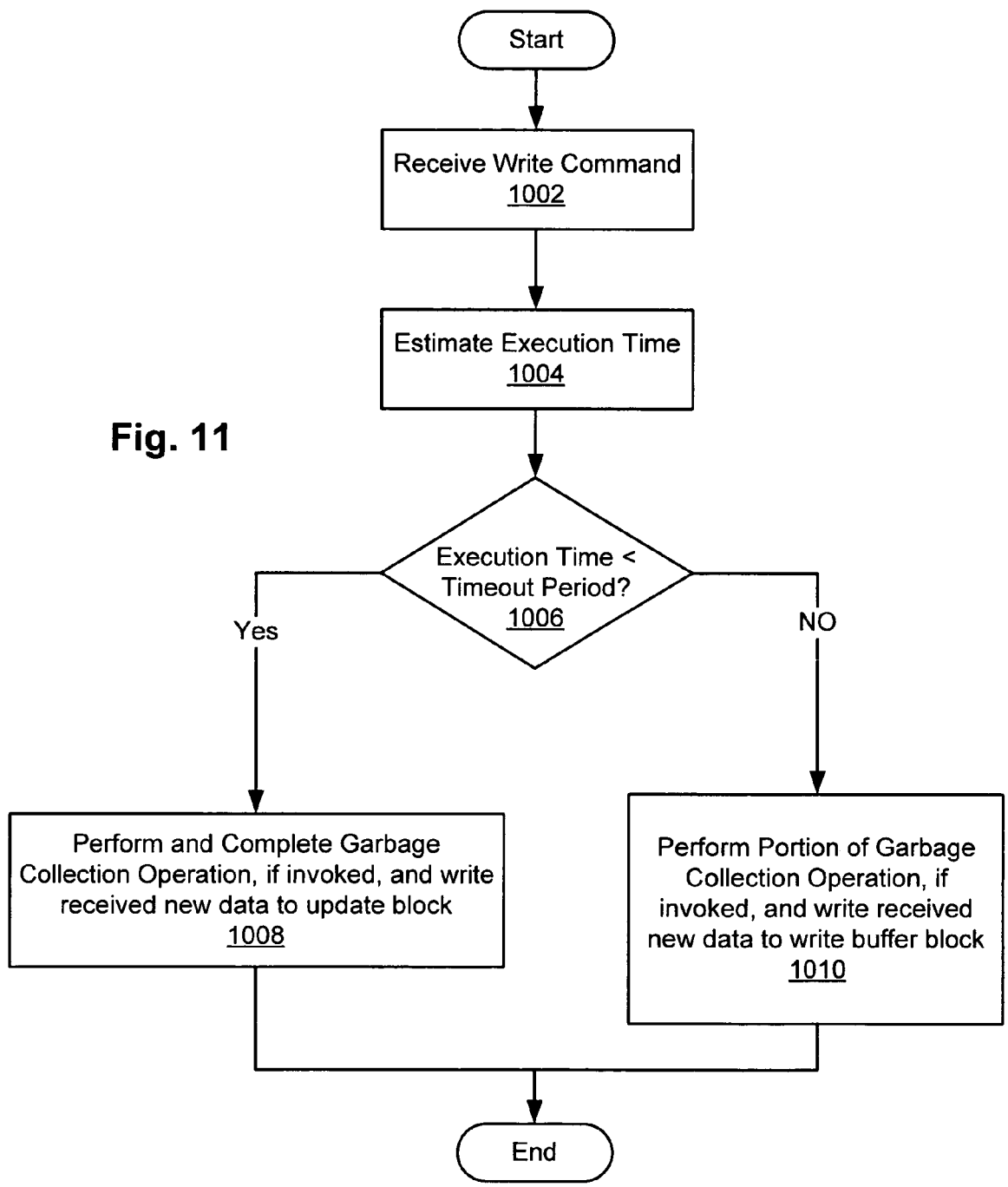
FIG. 11 is a flowchart diagram of operations to optimize access to the write buffer block, in accordance with an embodiment of the present invention.

FIG. 11 is a flowchart diagram of operations to optimize access to the write buffer block, in accordance with an embodiment of the present invention. The maintenance of the write buffer block introduces some overhead. To decrease the overhead, in an embodiment, writes to the write buffer block can be minimized. As shown in FIG. 11, a write command is received in operation 1002. Thereafter, the non-volatile memory storage system estimates an execution time in operation 1004. The execution time is the period of time to execute the write command. The execution of the write command may include, for example, programming (or writing) new data to memory, performing a garbage collection operation, and execution of other operations. For example, the execution time can include the period of time for copying the valid data from one or more blocks into another block and the period of time to write the new data.

The non-volatile memory storage system estimates the execution time in real time. The non-volatile memory storage system can estimate the execution time based on various parameters. Examples of parameters include the garbage collection type (e.g., block closure, consolidation, compaction, and other types), the amount of valid data stored in a block to be garbage collected (e.g., update block and other blocks), the programming time associated with the non-volatile memory storage system, a size of the block being garbage collected (e.g., a size of the metablock), whether pre-padding is required, an amount of data to be pre-padded, pipelining, caching, frequency settings, program failures, and other parameters. In an example of estimating an execution time, one or more first blocks include twelve pages of valid data and the twelve pages of valid data are to be copied to a second block. The non-volatile memory storage system can estimate the execution time by adding the amount of time the non-volatile memory storage system takes to read twelve pages of valid data and the amount of time the non-volatile memory storage system takes to write the valid data to the second block.

After the non-volatile memory storage system estimates the execution time, the execution time is compared with the timeout period in operation 1006. As shown in operation 1008, if the estimated execution time is less than the timeout period or the operations can be completed within the timeout period, then the garbage collection operation is performed and completed within the timeout period, if invoked, and the new data are written to an update block. On the other hand, as shown in operation 1010, if the estimated execution time exceeds the timeout period (i.e., greater than or equal to the timeout period), then the new data are written to the write buffer block and the allocated garbage collection time period can be used for write buffer block cleaning or for performing a portion of the garbage collection operation, if invoked. In an embodiment, as will be explained in more detail below, the write buffer block cleaning can begin with the first valid entry in the write buffer block, for the time remaining within the timeout period. By writing to the write buffer block when estimated execution time exceeds the timeout period, there will be fewer writes to the write buffer block and therefore, the overhead associated with maintaining the write buffer block can be decreased.

Write Buffer Block—Page Boundary Indexing

In an embodiment, the write buffer block is structured to include multiple pages and each page within the write buffer block is indexed. Each page of the write buffer block is configured to store one or more sectors of new data. Thus, one pointer points to or references one page, and multiple sectors within one page can be referenced by one pointer because the pointer points to a page and not to the multiple sectors within the page. Here, sectors of new data that belong to the same metapage are written the same metapage of the write buffer block. However, sectors of new data that belong to different metapages are written to different metapages of the write buffer block. For example, a first sector of new data associated with a first write command is written to a first page of the write buffer block. Thereafter, a second sector of new data is received from a second write command. If the second sector of new data belongs to the same metapage as the first second of new data, then the second sector is written to the first page of the write buffer block. On the other hand, if the second sector of new data belongs to a different metapage, then the second sector is written to a different metapage of the write buffer block.

Write Buffer Block—Sector Level Indexing

In another embodiment, the write buffer block is structured to include multiple sectors and one or more sectors within the write buffer block may be indexed. For example, one pointer can point to or reference multiple sectors (e.g., four sectors). In another example, one pointer can point to or reference one sector. In the example where each sector within the write buffer block is indexed, the new data are written to a single sector of the write buffer block. Subsequent new data associated with another write command are written to the next available sector in the write buffer block. For example, sectors of new data from multiple write commands can be written to different sectors of the same page in the write buffer block. Accordingly, the write buffer block can be structured to include multiple sectors and each sector is configured to store a sector of new data.

To sustain single sector writes without having timeout errors, the non-volatile memory storage system may allocate a number of sectors to a write buffer block such that the allocated sectors are greater than a total number of metablocks in the non-volatile memory storage system. It should be appreciated that the write buffer block may be comprised of multiple metablocks. To calculate the number of sectors allocated to a write buffer block, for example, the number of metablocks M that comprise the write buffer block can be defined as $$M = M1 + \frac{M1 * M2}{\text{Metablock\_Size} - M2} \quad (1.0)$$

where $M1 = RoundUp.to.Nearest.$
$$Integer\left[\frac{(N-1) * (Total.Nunber.of.Metablocks.in.System)}{\text{Metablock\_Size}}\right],$$

$$M2 = RoundUp.to.Nearest.Integer\left[\frac{N * Tgc}{N * TO - Tgc}\right],$$

$$N = RoundDown.to.Nearest.Integer\left[\frac{Tgc + TO}{TO}\right],$$

TO is the timeout period, and Tgc is the time to perform one full garbage collection operation. The total number of sectors that are allocated to the write buffer block can be defined as $$\text{Total number of sectors} = M*\text{Metablock\_Size} \qquad (1.2)$$

where M is defined in Equation 1.0 and Metablock_Size is the size of each metablock in sectors, such as 512 sectors/metablock, 1024 sectors/metablock, 2048 sectors/metablock, or other sizes. In general, Equation 1.0 and 1.2 define the total number of sectors allocated to the write buffer block to be greater than the total number of metablocks in the non-volatile memory storage system. In addition to the total number of metablocks, Equation 1.0 allocates one or more metablocks (or sectors) for maintaining the overhead (hereinafter "overhead metablocks" or "overhead sectors") associated with the write buffer block. For example, the portion of Equation 1.0 that defines the number of overhead metablocks is (M1*M2)/(Metablock_size-M2), where the overhead sectors can be calculated by multiplying the overhead blocks with the metablock size.

By allocating a number of sectors as defined in Equation 1.2 to the write buffer block, timeout errors can be avoided even in the worst case scenario of continuous, random single sector writes. A timeout error can occur when the write buffer block is full and a garbage collection operation cannot be completed. The worst case scenario occurs when each single sector write command writes to a different logical group, thereby causing a full garbage collection operation at every write. In this worse case scenario, sectors are accumulated and written to the write buffer block. The worse case scenario can be viewed as if a single sector of new data is written to the write buffer block at every timeout period and one sector is marked as invalid at every time the non-volatile memory storage system takes to perform one full garbage collection operation (Tgc). Additionally, when the write buffer block is filled or full, the write buffer block is compacted such that new sectors are received but a write buffer block cleaning operation cannot be performed. Accordingly, in a worse case scenario, the write buffer block is filled faster than is emptied when the garbage collection time period is greater than the timeout period.

However, if multiple sectors in the write buffer block belong to the same logical group, then all the sectors can be consolidated during one garbage collection operation. By allocating enough metablocks M to a write buffer block, there are more sectors (or entries) in the write buffer block than the total number of metablocks in the non-volatile memory storage system and accordingly, there are logical groups with multiple valid sectors written in the write buffer block. When a sector of the write buffer block is garbage collected or consolidated, all the sectors that belong to the same logical group are consolidated to a new update block, and marked as invalid in the write buffer block. Accordingly, the rate of emptying the write buffer block will be greater than the fill rate, and thereby preventing the write buffer block from being full or filled. Thus, for every given Tgc, the non-volatile memory storage system allocates a number of sectors to the write buffer block that are greater than the total number of metablocks in the non-volatile memory storage system, such that the occurrence of timeout errors could be prevented, even for the worst case scenario as described above.

Figure 12:
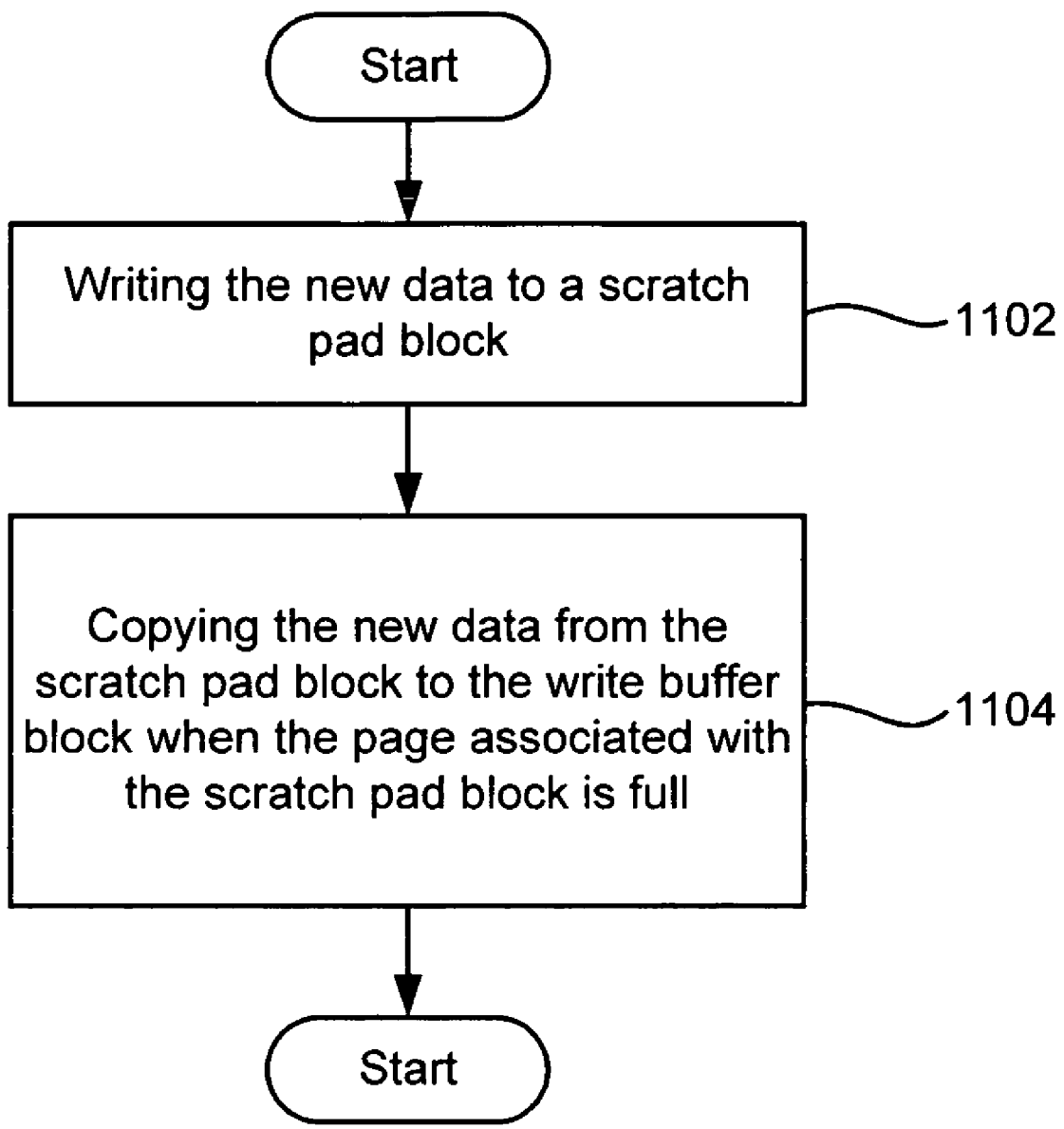
FIG. 12 is a flowchart diagram of operations for temporarily storing new data in a scratch pad block, in accordance with an embodiment of the present invention.

FIG. 12 is a flowchart diagram of operations for temporarily storing new data in a scratch pad block, in accordance with an embodiment of the present invention. It should be appreciated that the non-volatile memory storage system may have multi-level buffering or multiple buffer levels, which can be similar to the concept of multi-level caching. In this embodiment, the write buffer block may be associated with one of many buffer levels. With multiple buffer levels, instead of directly writing the new data to the write buffer block, the new data may be temporarily stored in another buffer level before being written to the write buffer block. The temporary storage of new data in a different buffer level than the buffer level of the write buffer block may reduce the complexity, overhead, and latency associated with the use of the write buffer block in phased garbage collection operations. An example of a buffer is a scratch pad block. The scratch pad block may be associated with a different buffer level than the write buffer block. For example, the scratch pad block may be used as a first buffer level and the write buffer block may be used as a second buffer level. As discussed above, with single sector indexing, sectors of new data from multiple write commands can be written to different sectors of the same page in the write buffer block. Since the non-volatile memory storage system may not be able to program partial pages, the new data can be temporarily stored in the first buffer level, such as a scratch pad block, before being transferred to the write buffer block, in accordance with an embodiment of the present invention. It should be appreciated that a scratch pad block is a form of data update block in which logical sectors within an associated logical group may be updated in a random order and with any amount of repetition. The scratch pad block is created by a write command where the intended logical sectors do not end or cross physical page boundary. Scratch pad block can contain partial physical page worth of data but no partial programmed page data are allowed. The scratch pad block can hold a valid page of data for each update block in the non-volatile memory storage system. The non-volatile memory storage system can have, for example, eight update blocks allocated and therefore, the scratch pad block can store nine valid pages of data.

As shown in FIG. 12, the new data received from a write command are first written to a scratch pad block in operation 1102. The scratch pad block can include multiple pages and each page includes multiple sectors. The new data are copied to a sector of the scratch pad block. In operation 1104, the new data are then copied from the scratch pad block to the write buffer block when a page in the scratch pad block, which is associated with the write buffer block, is full. The non-volatile memory storage system therefore accumulates sectors of a page in the scratch pad block until all the sectors of the page are filled with new data from various write commands. The non-volatile memory storage system then copies the full page (e.g., eight sectors of new data) from the scratch pad block to the write buffer block in one program operation. Since the write buffer block may be larger than the scratch pad block and may contain more valid data, the scratch pad block has less data to garbage collect. Thus, garbage collection of the scratch pad block is faster than garbage collection of the write buffer block. As a result, writing new data to the write buffer block by way of the scratch pad block is faster than directly writing the new data to the write buffer block.

Audio/Video Data

A host accessing data associated with audio/video files (hereinafter "audio/video data") stored in a non-volatile memory storage system may need to write the audio/video data at a pre-determined rate of speed when compared to other data. As the host streams the audio/video data to and/or from the non-volatile memory storage system, the bandwidth allocated to the stream matches or exceeds the pre-determined rate of speed. A garbage collection operation performed during the access of audio/video data can degrade the write performance of the audio/video data. Accordingly, in an embodiment, phased garbage collection is performed when the multiple sectors write command is not associated with audio/video data or the multiple sectors write command is at the beginning of an audio/video write.

To distinguish audio/video data from other data, in an embodiment, the non-volatile memory storage system can refer to the target logical address associated with the multiple sectors write command. Since audio/video data are written sequentially, a target logical address that is translated as a backwards jump can indicate that the new data is not audio/video data (or is the beginning of the audio/video data). In another embodiment, the non-volatile memory storage system can also distinguish audio/video data from other data by referring to the number of sectors associated with the new data. Audio/video data can be stored in units referred to as recording units. The minimum recording unit length associated with audio/video data can be 32 sectors. The number of sectors associated with new data that is not an integer multiple of 32 sectors can therefore indicate that the new data are not audio/video data. New data received that do not align to, or do not start at the beginning of, a recording unit, also can indicate that the new data are not audio/video data.

As a result, phased garbage collection can be performed if one of the following conditions apply: (1) the multiple sectors write command invokes garbage collection operation; (2) the target logical address is translated as a backwards jump; (3) the target logical address is not aligned to a recording unit boundaries; and (4) after the stop command is received (i.e., end of the multiple sectors write command), if the number of sectors associated with the new data is not an integer multiple of 32.

Single Sector Write

Figure 13:
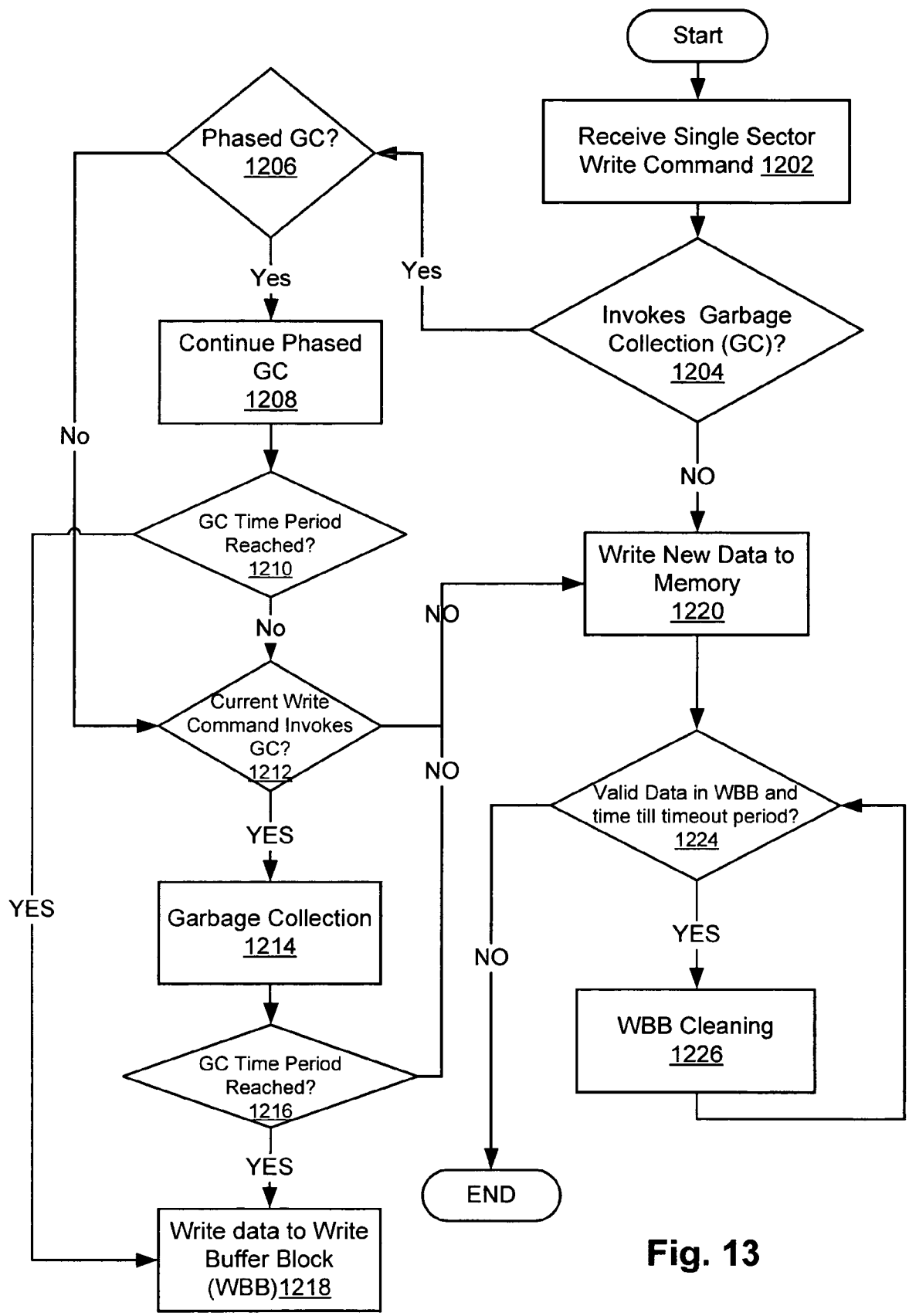
FIG. 13 is a flowchart diagram of non-volatile memory storage system operations associated with a single sector write command, in accordance with an embodiment of the present invention.

FIG. 13 is a flowchart diagram of non-volatile memory storage system operations associated with a single sector write command, in accordance with an embodiment of the present invention. New data can be written as single sectors to random addresses across a memory cell array. Depending on host activity and card fragmentation, the host may write a long file with multiple sectors using single sector write commands to random locations. Since there is a limited number of update blocks allocated, these single sector writes can exercise the update blocks rapidly, thereby can prompt the non-volatile memory storage system to perform garbage collection operations to clear blocks for subsequent write operations.

As shown in FIG. 13, a single sector write command is received in operation 1202. Thereafter, a determination is made in operation 1204 as to whether the single sector write command invokes a garbage collection operation. If the single sector write command does not invoke a garbage collection operation, then new data are written to the memory in operation 1220. However, if the single sector write command invokes a garbage collection operation, then another determination is made in operation 1206 as to whether there is a phased garbage collection pending (i.e., a garbage collection operation that has already started, but was phased because the garbage collection could not be completed). If there is phased garbage collection, then the phased garbage collection operation is continued in operation 1208. In other words, the remaining portion from the previous garbage collection operation is continued. As shown in operation 1210, the phased garbage collection operation is performed until garbage collection time period (e.g., difference between timeout period and programming time) or until the phased garbage collection is completed.

If the phased garbage collection operation cannot be completed within the garbage collection time period, then the new data are written to the write buffer block in operation 1218. If the garbage collection time period is not reached or the phased garbage collection operation can be completed before the garbage collection time period, then another determination is made in operation 1212 as to whether the single sector write command still invokes garbage collection operation, even after completing the phased garbage collection operation. If the single sector write command does not invoke a garbage collection operation, then the new data are written to the memory in operation 1220. On the other hand, if the single sector write command does invoke garbage collection, then a garbage collection operation is performed in operation 1214 until the garbage collection time period shown in operation 1216. If the garbage collection operation cannot be completed by garbage collection time period, then the new data are written to the write buffer block in operation 1218. Else, the new data are written to memory in operation 1220. It should be noted that if there is a phased garbage collection and the current write command also invokes a garbage collection operation, then the garbage collection time period shown in operation 1216 is a continuation of the garbage collection time period shown in operation 1210. Accordingly, if there is a phased garbage collection and the current single sector write command invokes a garbage collection operation, then both operations are completed within the total garbage collection time period. In other words, the execution time allocated for both phased garbage collection operation shown in operation 1208 and garbage collection operation shown in operation 1214 is, for example, the difference between timeout period and programming time.

After the new data are written to memory in operation 1220, a determination is made in operation 1224 as to whether there are valid entries in the write buffer block and whether the timeout period has been reached. If there are no valid entries in the write buffer block or the timeout period has been reached, then the operation ends. On the other hand, if there are valid entries and the timeout period has not been reached, then a write buffer block cleaning operation is performed in operation 1226 until the timeout period. A write buffer block compaction operation can also be performed during this period until the timeout period.

Multiple Sectors Write

Figure 14:
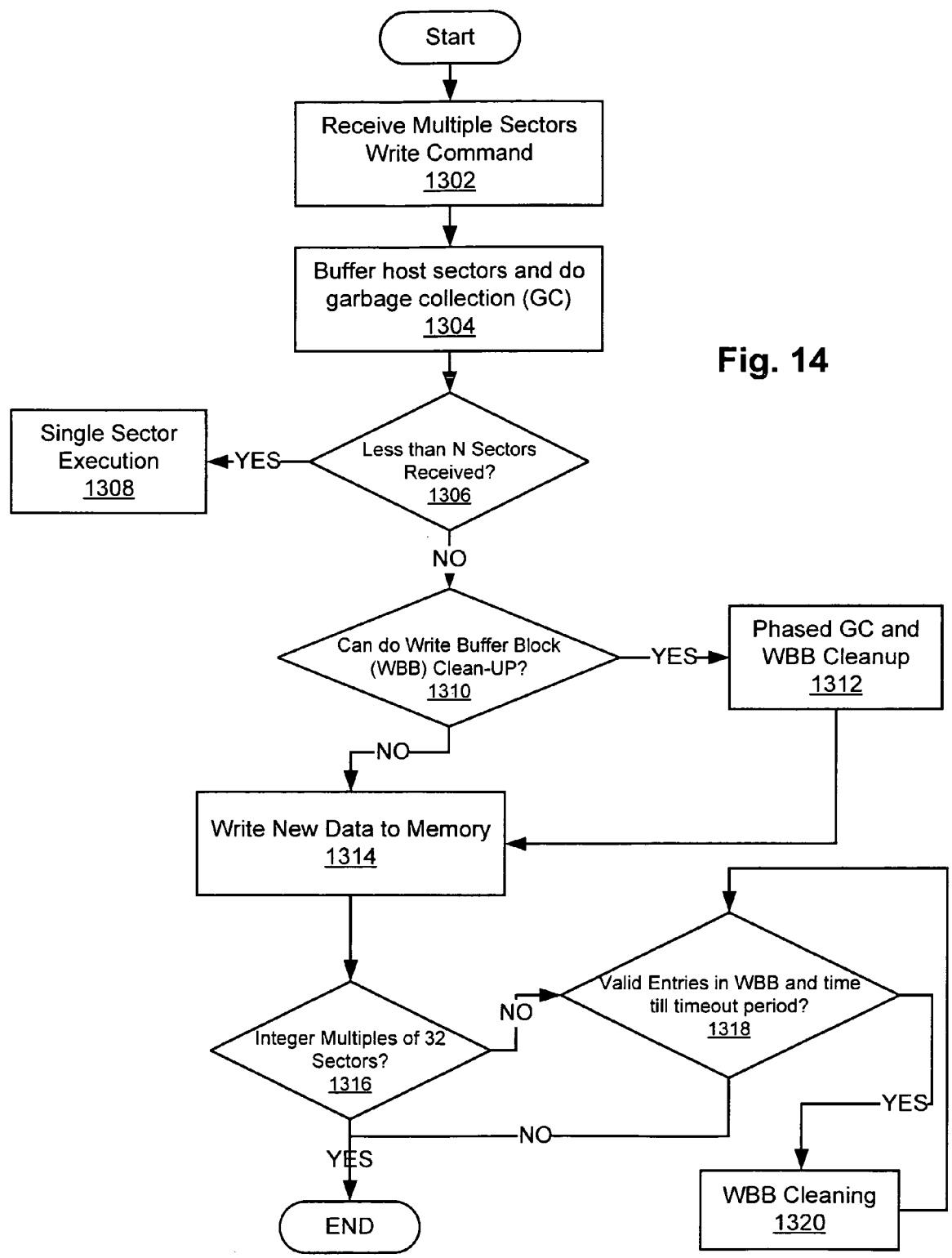
FIG. 14 is a flowchart diagram of non-volatile memory storage system operations associated with a multiple sectors write command, in accordance with an embodiment of the present invention.

FIG. 14 is a flowchart diagram of non-volatile memory storage system operations associated with a multiple sectors write command, in accordance with an embodiment of the present invention. Most new data written to the memory cell array are large data files occupying a contiguous sequential logical address space. Depending on host activity, the host may write the large data files using multiple sectors write commands. Such new data comprises multiple sectors of new data with multiple timeout periods. FIG. 7 shows an example of a multiple sectors write command. In general, since multiple timeout periods are available, the new data can be written to an allocated update block instead of the write buffer block. Therefore, the write buffer block are usually not used in multiple write commands because the garbage collection can usually be completed within the multiple timeout periods allocated to the multiple sectors write command.

As shown in FIG. 14, a multiple sectors write command is received in operation 1302. Thereafter, in operation 1304, the sectors of new data are stored (or buffered) and garbage collection operation can be performed, if needed. Here, the non-volatile memory storage system may not utilize a write buffer block because multiple timeout periods are allocated to the multiple sectors write command and one garbage collection operation can usually be completed by the end of the multiple sectors write command. Accordingly, instead of the write buffer block, the non-volatile memory storage system may store the new data in RAM associated with the non-volatile memory storage system, or in other memories associated with the non-volatile memory storage system, while asserting the busy signals between sectors of new data in order to use the allocated timeout periods to perform garbage collection operations.

After the host sectors are buffered, a determination is made in operation 1306 as to whether less than N sectors of the new data are received. As discussed above, new data associated with a multiple sectors write command may not be written to the write buffer block because the garbage collection operation can usually be completed within the multiple timeout periods allocated to the multiple sectors write operation. However, in an embodiment, the write buffer block may be used in a multiple sectors write command if there are not enough timeout periods allocated to complete the garbage collection operation. Accordingly, regardless of whether a garbage collection operation is invoked, a multiple sectors write command with at least N sectors of new data defined as $$N = \text{round-down to nearest integer } [(Tgc+TO)/TO] \quad (2.0)$$

can be written directly to the update blocks and not the write buffer block. Equation 2.0 shows that new data are written to the write buffer block when the write command is a single sector write command or when the non-volatile memory storage system receives less than N sectors of new data in a multiple sectors write command.

Still referring to FIG. 14, if less than N sectors are received, then the non-volatile memory storage system operates the multiple sectors write command in accordance with the single sector write command operations, which is shown in FIG. 13. However, if more than N sectors of new data are received, then a determination is made in operation 1310 as to whether a write buffer block cleaning operation can be performed. For example, the write buffer block cleaning operation may be performed if the new data received in operation 1302 did not invoke garbage collection, or if the new data invoked garbage collection that was completed before the allocated garbage collection time period. However, if the new data are aligned to recording unit boundaries, no write buffer block cleaning is performed, as the new data may be audio/video data. If the write buffer block cleaning operation cannot be performed, then the new data are written to memory in operation 1314. If the write buffer block cleaning operation can be performed, then a phased garbage collection operation and a write buffer block cleaning operation are performed in operation 1312 until the total busy period asserted by the non-volatile memory storage system during the multiple sectors write command execution is Tgc-Tprog. Thereafter, the new data are written to non-volatile memory cell array in operation 1314. In this embodiment, the write buffer block cleaning shown in operation 1312 may be performed in between the first few sectors (e.g., between the second and third sectors) received from the multiple sectors write command for a variety of periods, such as up to a period of Tgc-Tprog, four timeout periods, five timeout periods, and other periods.

After the write command is executed, a determination is made in operation 1316 as to whether the new data are integer multiples of 32 sectors. If the new data are integer multiples of 32 sectors, then the new data may be audio/video related and the operation ends. On the other hand, if the new data are not integer multiples of 32 sectors, then a determination is made in operation 1318 as to whether there are valid entries in the write buffer block and whether the timeout period has been reached. If there are no valid entries in the write buffer block or the timeout period has been reached, then the operation ends. On the other hand, if there are valid entries and the timeout period has not been reached, then a write buffer block cleaning operation is performed in operation 1320 until the timeout period.

The above-described embodiments provide methods and/or systems for phased garbage collection. A garbage collection operation can be split into multiple phases and the multiple phases are performed over multiple timeout periods. By splitting the garbage collection operation, each phase of the garbage collection operation can be completed within the timeout period and thereby prevent timeout errors.

Although the foregoing embodiments have been described in some detail for purposes of clarity of understanding, the embodiments are not limited to the details provided. There are many alternative ways of implementing the embodiments. Accordingly, the disclosed embodiments are to be considered as illustrative and not restrictive, and the embodiments are not to be limited to the details given herein, but may be modified within the scope and equivalents of the appended claims. In the claims, elements and/or operations do not imply any particular order of operation, unless explicitly stated in the claims.

What is claimed is:

1. A non-volatile memory storage system, comprising:
   a memory configured to store a storage system firmware;
   a non-volatile memory cell array configured to maintain a write buffer block, the write buffer block being configured to span a plurality of logical addresses; and
   a processor in communication with the memory and the non-volatile memory cell array, the processor being configured to execute the storage system firmware stored in the memory, the storage system firmware comprising program instructions for,
   receiving a write command to write a plurality of data to the non-volatile memory cell array, the write command being allocated a timeout period to complete an execution of the write command,
   asserting a busy signal,
   performing a portion of a garbage collection operation for a garbage collection time period,
   writing the plurality of data to the write buffer block,
   releasing the busy signal before the timeout period
   wherein the program instructions for performing the portion of the garbage collection operation or the garbage collection time period comprises program instructions for copying a portion of a plurality of valid data from one or more first blocks of the non-volatile memory cell array to a second block of the non-volatile memory cell array for the garbage collection time period.

2. The non-volatile memory storage system of claim 1, wherein the storage system firmware further comprises program instructions for:
   estimating an execution time for the execution of the write command before the performing the portion of the garbage collection operation and the writing the plurality of data to the write buffer block,
   wherein the portion of the garbage collection operation is performed and the plurality of data is written to the write buffer block if the execution time is greater than the timeout period.

3. The non-volatile memory storage system of claim 1, wherein the program instructions for the writing the plurality of data to the write buffer block comprises program instructions for:
   writing the plurality of data to a scratch pad block; and copying the plurality of data from the scratch pad block to the write buffer block.

4. The non-volatile memory storage system of claim 1, wherein the write buffer block comprises a plurality of pages and wherein each of the plurality of pages is indexed.

5. The non-volatile memory storage system of claim 1, wherein the write buffer block comprises a plurality of sectors and wherein each of the plurality of sectors is indexed.

6. The non-volatile memory storage system of claim 1, wherein the write buffer block comprises a plurality of blocks.

7. A non-volatile memory storage system, comprising:
a read-only memory (ROM) configured to store a storage system firmware;
a memory cell array configured to maintain a write buffer block, the write buffer block being configured to span a plurality of logical addresses;
a non-volatile memory cell array; and
a processor in communication with the ROM, the memory cell array, and the non-volatile memory cell array, the processor being configured to execute the storage system firmware stored in the ROM, the storage system firmware comprising program instructions for,
receiving a first write command to write a first plurality of data to the non-volatile memory cell array, the first write command being allocated a first timeout period to complete a first execution of the first write command;
asserting a first busy signal,
copying a first portion of a plurality of valid data from one or more first blocks of the non-volatile memory cell array to a second block of the non-volatile memory cell array for a garbage collection time period,
writing the first plurality of data to the write buffer block,
releasing the first busy signal before the first timeout period,
receiving a second write command to write a second plurality of data to the non-volatile memory cell array, the second write command being received after the receiving the first write command, the second write command being allocated a second timeout period to complete a second execution of the second write command,
asserting a second busy signal,
copying a second portion of the plurality of valid data from the one or more first blocks to the second block for the garbage collection time period, and
releasing the second busy signal before the second timeout period.

8. The non-volatile memory storage system of claim 7, wherein the storage system firmware further comprises program instructions for writing the second plurality of data to the write buffer block.

9. The non-volatile memory storage system of claim 7, wherein the storage system firmware further comprises program instructions for writing the second plurality of data to an update block.

10. The non-volatile memory storage system of claim 7, wherein the storage system firmware further comprises program instructions for erasing the one or more first blocks if the second portion of the plurality of valid data is a last portion of the plurality of valid data.

11. The non-volatile memory storage system of claim 7, wherein the storage system firmware further comprises program instructions for copying the first plurality of data from the write buffer block to an update block.

12. The non-volatile memory storage system of claim 7, wherein the write buffer block comprises a plurality of pages, and wherein the first plurality of data is written to a first page associated with the write buffer block and the second plurality of data is written to a second page associated with the write buffer block.

13. The non-volatile memory storage system of claim 7, wherein the write buffer block comprises a plurality of sectors, and wherein the first plurality of data is written to a first sector associated with the write buffer block and the second plurality of data is written to a second sector associated with the write buffer block.

14. The non-volatile memory storage system of claim 7, wherein the non-volatile memory storage system comprises a plurality of buffering levels, the write buffer block being associated with one of the plurality of buffering levels.

15. The non-volatile memory storage system of claim 7, wherein the program instructions for the writing the first plurality of data to the write buffer block comprises program instructions for:
writing the first plurality of data to a sector of a scratch pad block, wherein a page associated with the sector comprises a plurality of sectors; and
copying the page to the write buffer block when the plurality of sectors associated with the page is filled.

16. The non-volatile memory storage system of claim 15, wherein the scratch pad block is associated with a first buffer level and the write buffer block is associated with a second buffer level.

17. The non-volatile memory storage system of claim 7, wherein the program instructions for writing the plurality of data comprises program instructions for:
writing the plurality of data to a first buffer level; and
copying the plurality of data from the first buffer level to the write buffer block, the write buffer block being associated with a second buffer level.

18. A non-volatile memory storage system, comprising:
a memory configured to store a storage system firmware;
a non-volatile memory cell array configured to maintain a write buffer block, the write buffer block being configured to span a plurality of logical addresses; and
a processor in communication with the memory and the non-volatile memory cell array, the processor being configured to execute the storage system firmware stored in the memory, the storage system firmware comprising program instructions for,
receiving a write command to write a plurality of data to the non-volatile memory cell array, the non-volatile memory cell array being allocated a timeout period to complete an execution of the write command,
asserting a busy signal,
copying a portion of a plurality of valid data from one or more first blocks to a second block for a garbage collection time period,
writing the plurality of data to the write buffer block, and
releasing the busy signal before the timeout period.

19. The non-volatile memory storage system of claim 18, wherein the program instructions for the copying the portion of the plurality of valid data comprises program instructions for:
tracking a time for the copying the portion of the plurality of valid data from the one or more first blocks to the second block; and
stopping the copying the portion of the plurality of valid data before the time exceeds the garbage collection time period.

20. The non-volatile memory storage system claim 18, wherein the storage system firmware further comprises program instructions for:

estimating an execution time for the execution of the write command before the copying the plurality of valid data and the writing the plurality of data, wherein the portion of the plurality of valid data is copied and the plurality of data is written to the write buffer block if the execution time exceeds the timeout period.

21. The non-volatile memory storage system of claim 18, wherein the program instructions for the writing the portion of the plurality of data comprises program instructions for:

providing a scratch pad block comprising a page, the page comprising a plurality of sectors;

writing the plurality of data to a sector associated with the page; and copying the page from the scratch pad block to the write buffer block when the page is full.

22. The non-volatile memory storage system of claim 18, wherein the garbage collection time period is a difference between the timeout period and a programming time associated with the writing the plurality of data.

23. The non-volatile memory storage system of claim 18, wherein the write buffer block is configured to span an entire logical address space.

24. The non-volatile memory storage system of claim 18, wherein the write buffer block is configured for a sector level index.

25. The non-volatile memory storage system of claim 18, wherein the write buffer block is configured for a page boundary index.

26. The non-volatile memory storage system of claim 18, wherein the storage system firmware further comprises program instructions for allocating a plurality of sectors to the write buffer block, the plurality of sectors being greater than a total number of metablocks in the non-volatile memory storage system.

* * * * *